(12) United States Patent
Tashiro et al.

(10) Patent No.: US 12,194,873 B2
(45) Date of Patent: Jan. 14, 2025

(54) POWER CONVERSION APPARATUS, VEHICLE INCLUDING THE SAME, AND METHOD OF CONTROLLING

(71) Applicant: Sumitomo Electric Industries, Ltd., Osaka (JP)

(72) Inventors: Keiji Tashiro, Osaka (JP); Seiji Takahashi, Osaka (JP); Shinsuke Tachizaki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 272 days.

(21) Appl. No.: 17/780,024

(22) PCT Filed: Dec. 4, 2019

(86) PCT No.: PCT/JP2019/047430
§ 371 (c)(1),
(2) Date: May 26, 2022

(87) PCT Pub. No.: WO2021/111547
PCT Pub. Date: Jun. 10, 2021

(65) Prior Publication Data
US 2022/0410738 A1 Dec. 29, 2022

(51) Int. Cl.
*B60L 53/20* (2019.01)
*H02M 1/14* (2006.01)
(Continued)

(52) U.S. Cl.
CPC ............... *B60L 53/20* (2019.02); *H02M 1/14* (2013.01); *H02M 3/33573* (2021.05); *H02M 7/5387* (2013.01); *B60L 2210/10* (2013.01)

(58) Field of Classification Search
CPC ............ B60L 53/20; B60L 2210/10; H02M 3/33573; H02M 1/14; H02M 7/5387
(Continued)

(56) References Cited

U.S. PATENT DOCUMENTS

| 2002/0136029 A1* | 9/2002 | Ledenev | G06F 1/26 |
| | | | 363/16 |
| 2014/0009971 A1* | 1/2014 | Itou | H02M 1/44 |
| | | | 363/21.01 |

(Continued)

FOREIGN PATENT DOCUMENTS

| CA | 3126832 A1 * | 8/2020 | ............. B60L 53/20 |
| JP | 2004-507995 A | 3/2004 | |

(Continued)

OTHER PUBLICATIONS

E. Otama Co., Ltd., "Overview of CISPR 25 (ed. 2)", OHTAMA, Nov. 18, 2016, pp. 1-13 (29 pages including English Translation).

(Continued)

*Primary Examiner* — Yemane Mehari
(74) *Attorney, Agent, or Firm* — XSENSUS LLP

(57) ABSTRACT

A power conversion apparatus includes a switching circuit including multiple switching elements, and a control unit configured to control and switch the multiple switching elements included in the switching circuit at a predetermined switching frequency with a direct current voltage applied to an input terminal of the switching circuit. The switching circuit is configured to convert the direct current voltage applied to the input terminal and to output a converted electric current. The switching frequency is set such that the switching frequency and a main frequency component of a ripple occurring in the electric current are out of a frequency range used for communication with a vehicle-mounted receiver.

13 Claims, 15 Drawing Sheets

(51) Int. Cl.
*H02M 3/335* (2006.01)
*H02M 7/5387* (2007.01)

(58) Field of Classification Search
USPC .......................................................... 363/37
See application file for complete search history.

(56) References Cited

U.S. PATENT DOCUMENTS

| | | | |
|---|---|---|---|
| 2015/0372598 A1* | 12/2015 | Akiyama | H02M 3/285 363/17 |
| 2019/0043661 A1* | 2/2019 | Jin | H01F 27/346 |
| 2019/0131874 A1* | 5/2019 | Saga | H02M 3/158 |
| 2021/0135578 A1* | 5/2021 | Tanaka | H02M 7/537 |

FOREIGN PATENT DOCUMENTS

| | | |
|---|---|---|
| JP | 2008-79386 A | 4/2008 |
| JP | 2014-17970 A | 1/2014 |
| JP | 2015-56912 A | 3/2015 |

OTHER PUBLICATIONS

Rohm Company Limited, "Built-in 1 ch synchronous rectification in a vehicle-mounted 3.0V-36V input 2.0A FET Low dark current step-down DC / DC converter BD9P233MUF—C, sheet,", ROHM Semiconductor, Datasheet, TSZ02201-0J1JAL01460-1-1, Jul. 19, 2019, pp. 1-43.
Notice of Reasons for Refusal mailed on Jan. 5, 2021, received for JP Application 2020-523037, 8 pages including English Translation.

* cited by examiner

FIG. 2

| SERVICE/BAND | | FREQUENCY MHz | LEVEL, dB(μV) | | | | | | | | | | | | |
|---|---|---|---|---|---|---|---|---|---|---|---|---|---|---|---|
| | | | CLASS 5 | | | CLASS 4 | | | CLASS 3 | | | CLASS 2 | | | CLASS 1 | | |
| | | | PEAK | SEMI-PEAK | AVERAGE | PEAK | SEMI-PEAK | AVERAGE | PEAK | SEMI-PEAK | AVERAGE | PEAK | SEMI-PEAK | AVERAGE | PEAK | SEMI-PEAK | AVERAGE |
| BROADCAST | LW | 0.15 – 0.30 | 70 | 57 | 50 | 80 | 67 | 60 | 90 | 77 | 70 | 100 | 87 | 80 | 110 | 97 | 90 |
| | MW | 0.53 – 1.8 | 54 | 41 | 34 | 62 | 49 | 42 | 70 | 57 | 50 | 78 | 65 | 58 | 86 | 73 | 66 |
| | SW | 5.9 – 6.2 | 53 | 40 | 33 | 59 | 46 | 39 | 65 | 52 | 45 | 71 | 58 | 51 | 77 | 64 | 57 |
| | FM | 76 – 108 | 38 | 25 | 18 | 44 | 31 | 24 | 50 | 37 | 30 | 56 | 43 | 36 | 62 | 49 | 42 |
| | TV Band I | 41 – 88 | 34 | – | 24 | 40 | – | 30 | 46 | – | 36 | 52 | – | 42 | 58 | – | 48 |
| | TV Band III | 174 – 230 | | | | | | | | | | | | | CONDUCTION EMISSION – VOLTAGE METHOD NOT APPLICABLE | | |
| | DAB III | 171 – 245 | | | | | | | | | | | | | | | |
| | TV Band IV | 468 – 944 | | | | | | | | | | | | | | | |
| | DTTV | 470 – 770 | | | | | | | | | | | | | | | |
| | DAB L Band | 1447 – 1494 | | | | | | | | | | | | | | | |
| | SDARS | 2320 – 2345 | | | | | | | | | | | | | | | |

FIG. 3

| SERVICE/BAND | | FREQUENCY MHz | LEVEL, dB(μV/m) | | | | | | | | | | | | | |
|---|---|---|---|---|---|---|---|---|---|---|---|---|---|---|---|---|
| | | | CLASS 5 | | | CLASS 4 | | | CLASS 3 | | | CLASS 2 | | | CLASS 1 | | |
| | | | PEAK | SEMI-PEAK | AVERAGE | PEAK | SEMI-PEAK | AVERAGE | PEAK | SEMI-PEAK | AVERAGE | PEAK | SEMI-PEAK | AVERAGE | PEAK | SEMI-PEAK | AVERAGE |
| BROADCAST | LW | 0.15 – 0.30 | 46 | 33 | 26 | 56 | 43 | 36 | 66 | 53 | 46 | 76 | 63 | 56 | 86 | 73 | 66 |
| | MW | 0.53 – 1.8 | 40 | 27 | 20 | 48 | 35 | 28 | 56 | 43 | 36 | 64 | 51 | 44 | 72 | 59 | 52 |
| | SW | 5.9 – 6.2 | 40 | 27 | 20 | 46 | 33 | 26 | 52 | 39 | 32 | 58 | 45 | 38 | 64 | 51 | 44 |
| FM | | 76 – 108 | 38 | 25 | 18 | 44 | 31 | 24 | 50 | 37 | 30 | 56 | 43 | 36 | 62 | 49 | 42 |
| TV Band I | | 41 – 88 | 28 | – | 18 | 34 | – | 24 | 40 | – | 30 | 46 | – | 36 | 52 | – | 42 |
| TV Band III | | 174 – 230 | 32 | – | 22 | 38 | – | 28 | 44 | – | 34 | 50 | – | 40 | 56 | – | 46 |
| DAB III | | 171 – 245 | 26 | – | 16 | 32 | – | 22 | 38 | – | 28 | 44 | – | 34 | 50 | – | 40 |
| TV Band IV | | 468 – 944 | 41 | – | 31 | 47 | – | 37 | 53 | – | 43 | 59 | – | 49 | 65 | – | 55 |
| DTTV | | 470 – 770 | 45 | – | 35 | 51 | – | 41 | 57 | – | 47 | 63 | – | 53 | 69 | – | 59 |
| DAB L Band | | 1447 – 1494 | 28 | – | 18 | 34 | – | 24 | 40 | – | 30 | 46 | – | 36 | 52 | – | 42 |
| SDARS | | 2320 – 2345 | 34 | – | 24 | 40 | – | 30 | 46 | – | 36 | 52 | – | 42 | 58 | – | 48 |

POWER CONVERSION APPARATUS, VEHICLE INCLUDING THE SAME, AND METHOD OF CONTROLLING

CROSS-REFERENCE TO RELATED APPLICATION

The present application is based on PCT filing PCT/JP2019/047430, filed Dec. 4, 2019, the entire contents of which are incorporated herein by reference.

TECHNICAL FIELD

The present disclosure relates to a power conversion apparatus, a vehicle that includes the power conversion apparatus, and a method of controlling.

BACKGROUND ART

Power conversion apparatuses are used for various kinds of electric equipment and electric facilities ranging from vehicles. For example, as for a vehicle such as a PHEV (Plug-in Hybrid Electric Vehicle) or an EV (Electric Vehicle), the output voltage of a battery is converted into an appropriate voltage by using a power conversion apparatus, and the voltage is supplied to devices in the vehicle. A power conversion apparatus such as a DC-DC converter uses a switching circuit that includes a semiconductor switching element. The switching operation of the switching circuit that is performed at a high frequency causes a noise.

PTL 1 described below discloses that noise filter characteristics are improved to reduce a radiation noise that is made by performing the switching operation of a switching circuit at a high frequency in a DC-DC converter.

CITATION LIST

Patent Literature

PTL 1: Japanese Unexamined Patent Application Publication No. 2014-17970

Non Patent Literature

NPL 1: Sato Toshinori, "Outline of CISPR 25 (ed. 2)", [online], [searched Oct. 31, 2019], internet <URL: https://www.emc-ohtama.jp/emc/doc/cispr25-explained.pdf>

SUMMARY OF INVENTION

A power conversion apparatus according to an aspect of the present disclosure includes a switching circuit including multiple switching elements, and a control unit configured to control and switch the multiple switching elements included in the switching circuit at a predetermined switching frequency with a direct current voltage applied to an input terminal of the switching circuit. The switching circuit is configured to convert the direct current voltage applied to the input terminal and to output a converted electric current, and the switching frequency is set such that the switching frequency and a main frequency component of a ripple occurring in the electric current are out of a frequency range used for communication with a vehicle-mounted receiver.

A vehicle according to another aspect of the present disclosure includes the power conversion apparatus described above.

A method of controlling according to another aspect of the present disclosure includes a method of controlling a power conversion apparatus including a switching circuit including multiple switching elements. The method includes applying a direct current voltage to an input terminal of the switching circuit, and converting the direct current voltage applied to the input terminal by controlling and switching the multiple switching elements included in the switching circuit at a predetermined switching frequency with the direct current voltage applied to the input terminal and outputting a converted electric current. The switching frequency is set such that the switching frequency and a main frequency component of a ripple occurring in the electric current are out of a frequency range used for communication with a vehicle-mounted receiver.

BRIEF DESCRIPTION OF DRAWINGS

FIG. 2 illustrates an example (a voltage method) of the limit value of conduction interference in the CISPR standard in the form of a table.

FIG. 3 illustrates an example (an ALSE method) of the limit value of radiation interference in the CISPR standard in the form of a table.

DESCRIPTION OF EMBODIMENTS

Problems to be Solved by Present Disclosure

In order to decrease the size of a power conversion apparatus such as a DC-DC converter that is mounted in a vehicle, it is through that the size of a magnetic component is decreased in a manner in which a switching frequency at which a switching element that is included in a circuit is turned on or off is increased to a high frequency. When the switching frequency is increased to a high frequency, however, there is a possibility that a noise that is emitted from the power conversion apparatus causes communication interference in a peripheral device.

Figure 1:
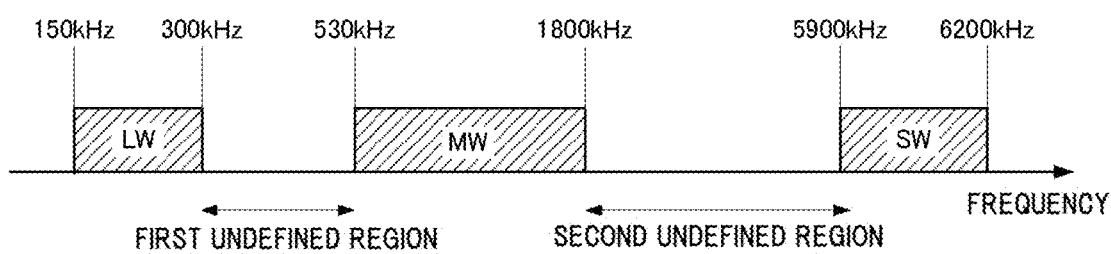
FIG. 1 illustrates an example of a frequency band in which the limit value of a noise is defined in a CISPR standard.

CISPR 25 of CISPR (International Special Committee on Radio Interference, Comite international Special des Perturbations Radioelectriques) is known as an international standard for protecting a vehicle-mounted receiver from interference that occurs due to conduction and radiation emissions in a vehicle (see NPL 1). Referring to, for example, FIG. 1, CISPR 25 defines the limit values of a conduction noise and a radiation noise regarding the frequency bands of a long wave (referred to below as a LW) at 150 kHz to 300 kHz, a middle wave (referred to below as a MW) at 530 kHz to 1800 kHz, and a short wave (referred to below as SW) at 5900 kHz to 6200 kHz. Specifically, as illustrated in FIG. 2 and FIG. 3, CISPR 25: 2016 defines the limit values. FIG. 2 illustrates the limit value of the conduction noise regarding frequency bands denoted in SERVICE/BAND. FIG. 3 illustrates the limit value of the radiation noise regarding the frequency bands denoted in SERVICE/BAND. In FIG. 2 and FIG. 3, the limit values of LM, MW, and SW illustrated in FIG. 1 are denoted in thick frames.

It is necessary for the power conversion apparatus that is mounted in the vehicle to satisfy the limit values defined in CISPR 25. Accordingly, it is necessary to add a noise countermeasure member into the power conversion apparatus. Consequently, there is a problem in that the size of the entire power conversion apparatus cannot be decreased even in the case where the switching frequency is increased to a high frequency.

Accordingly, it is an object of the present disclosure to provide a power conversion apparatus that enables a switching operation to be performed at a high frequency without communication interference in a peripheral device, a vehicle that includes the power conversion apparatus, and a method of controlling.

Advantageous Effects of Present Disclosure

According to the present disclosure, the switching operation of a power conversion apparatus can be performed at a high frequency. Accordingly, size and weight can be decreased, and the power conversion apparatus is readily mounted in a vehicle.

DESCRIPTION OF EMBODIMENT OF PRESENT DISCLOSURE

The content of an embodiment of the present disclosure will be listed and described. At least parts of the embodiment described below may be combined.

(1) A power conversion apparatus according to a first aspect of the present disclosure includes a switching circuit including multiple switching elements, and a control unit configured to control and switch the multiple switching elements included in the switching circuit at a predetermined switching frequency with a direct current voltage applied to an input terminal of the switching circuit. The switching circuit is configured to convert the direct current voltage applied to the input terminal and to output a converted electric current. The switching frequency is set such that the switching frequency and a main frequency component of a ripple occurring in the electric current are out of a frequency range used for communication with a vehicle-mounted receiver. Consequently, the switching operation of the power conversion apparatus can be performed at a high frequency, and the size and weight of the power conversion apparatus can be decreased. For example, the switching frequency and the main frequency component of the ripple can be set to be in a frequency range in which the limit value of a noise is not defined in CISPR 25 that is an international standard.

(2) The switching frequency is preferably higher than 300 kHz and is lower than 530 kHz, and the main frequency component of the ripple is preferably higher than 1800 kHz and is lower than 5900 kHz. This enables CISPR 25 to be satisfied without adding a noise countermeasure member.

(3) The switching frequency is more preferably higher than 450 kHz and is lower than 530 kHz. This enables CISPR 25 to be satisfied with more certainty.

(4) The switching circuit preferably includes multiple subcircuits including the multiple switching elements and connected in parallel. Each of the multiple subcircuits is preferably configured to receive the direct current voltage applied from the input terminal and output a signal generated by converting the direct current voltage received by the subcircuit. The switching elements included in the multiple subcircuits are preferably controlled and switched by the control unit such that the signals outputted from the respective multiple subcircuits have a predetermined phase difference from each other. The phase difference is preferably a value based on a predetermined angle and a number of the multiple subcircuits. This enables the main frequency component of a ripple superposed on an outputted electric current to be higher than the switching frequency and enables the switching frequency and the main frequency component of the ripple to be set to a value in the frequency range in which the limit value of the noise is not defined in CISPR 25.

For example, a phase difference can be set to a value acquired by dividing 180 degrees or 360 degrees by the number of the multiple subcircuits.

(5) Each of the multiple subcircuits preferably includes a full bridge circuit including the switching element included in the subcircuit, or each of the multiple subcircuits preferably includes a chopper circuit including the switching element included in the subcircuit. This enables the main frequency component of the ripple superposed on the outputted electric current to be higher than the switching frequency and enables the switching frequency and the main frequency component of the ripple to be set to a value in the frequency range in which the limit value of the noise is not defined in CISPR 25.

(6) Each of the multiple subcircuits preferably further includes an inductor configured to smooth the signal to be outputted from the subcircuit and to output a smooth signal. The inductor preferably has a clamp structure including a linear conductive member configured not to form a closed loop surrounding magnetic flux and a magnetic member disposed around the conductive member. The conductive member is preferably formed so as not to surround magnetic flux formed when an electric current flows through the conductive member. This enables manufacturing to be easier than a coil having a winding structure.

(7) The conductive member preferably includes multiple linear members. The inductor preferably further includes an insulating member disposed between the multiple linear members. The multiple linear members and the insulating member preferably form a multilayer structure. First end portions of the multiple linear members close to each other are preferably connected to each other. Second end portions of the multiple linear members close to each other are preferably connected to each other. This enables the size of the power conversion apparatus to be decreased and enables manufacturing to be more readily completed.

(8) The switching circuit preferably includes an even number of subcircuits. Each of the even number of subcircuits preferably further includes an inductor configured to smooth the signal to be outputted from the subcircuit and to output a smooth signal. At least a pair of an even number of the inductors is preferably magnetically coupled. This enables the size of a choke coil to be decreased and enables the size of the power conversion apparatus to be further decreased.

(9) Each of the multiple subcircuits preferably includes a full bridge circuit including the switching element included in the subcircuit, and a transformer. The transformer preferably includes a primary winding formed by winding a single first conductive member or multiple first conductive members connected in parallel multiple times and a secondary winding formed by winding a single second conductive member or multiple second conductive members connected in parallel multiple times. At least a winding portion of the primary winding or the secondary winding is preferably disposed between adjacent winding portions of the other of the primary winding or the secondary winding. This enables an eddy current loss that becomes a problem when the transformer is used at a high frequency to be reduced and enables an iron loss to be reduced.

(10) Each of the multiple switching elements is preferably composed of a wide-bandgap semiconductor. This enables a loss to be reduced even when a switching speed increases, and the switching frequency increases.

(11) The power conversion apparatus preferably further includes a container configured to cover the switching circuit and composed of a conductive member. This enables a noise that is made in the power conversion apparatus to be inhibited from being emitted to the outside.

(12) The electric current outputted from the switching circuit is preferably 50 A or more. This enables the power conversion apparatus to be mounted in a vehicle and enables a low voltage to be supplied.

(13) A vehicle according to a second aspect of the present disclosure is a vehicle that includes the power conversion apparatus described above. Since the power conversion apparatus is small and light, the power conversion apparatus is readily mounted in the vehicle.

(14) A method of controlling according to a third aspect of the present disclosure is a method of controlling a power conversion apparatus including a switching circuit including multiple switching elements. The method includes applying a direct current voltage to an input terminal of the switching circuit, and converting the direct current voltage applied to the input terminal by controlling and switching the multiple switching elements included in the switching circuit at a predetermined switching frequency with the direct current voltage applied to the input terminal and outputting a converted electric current. The switching frequency is set such that the switching frequency and a main frequency component of a ripple occurring in the electric current are out of a frequency range used for communication with a vehicle-mounted receiver. Consequently, the switching operation of the power conversion apparatus can be performed at a high frequency, and the size and weight of the power conversion apparatus can be decreased.

DETAIL OF EMBODIMENT OF PRESENT DISCLOSURE

In the embodiment described below, like components are designated by like reference numbers. The names and functions thereof are the same. Accordingly, the detailed description thereof is not repeated.

(Structure of Circuit)

Figure 4:
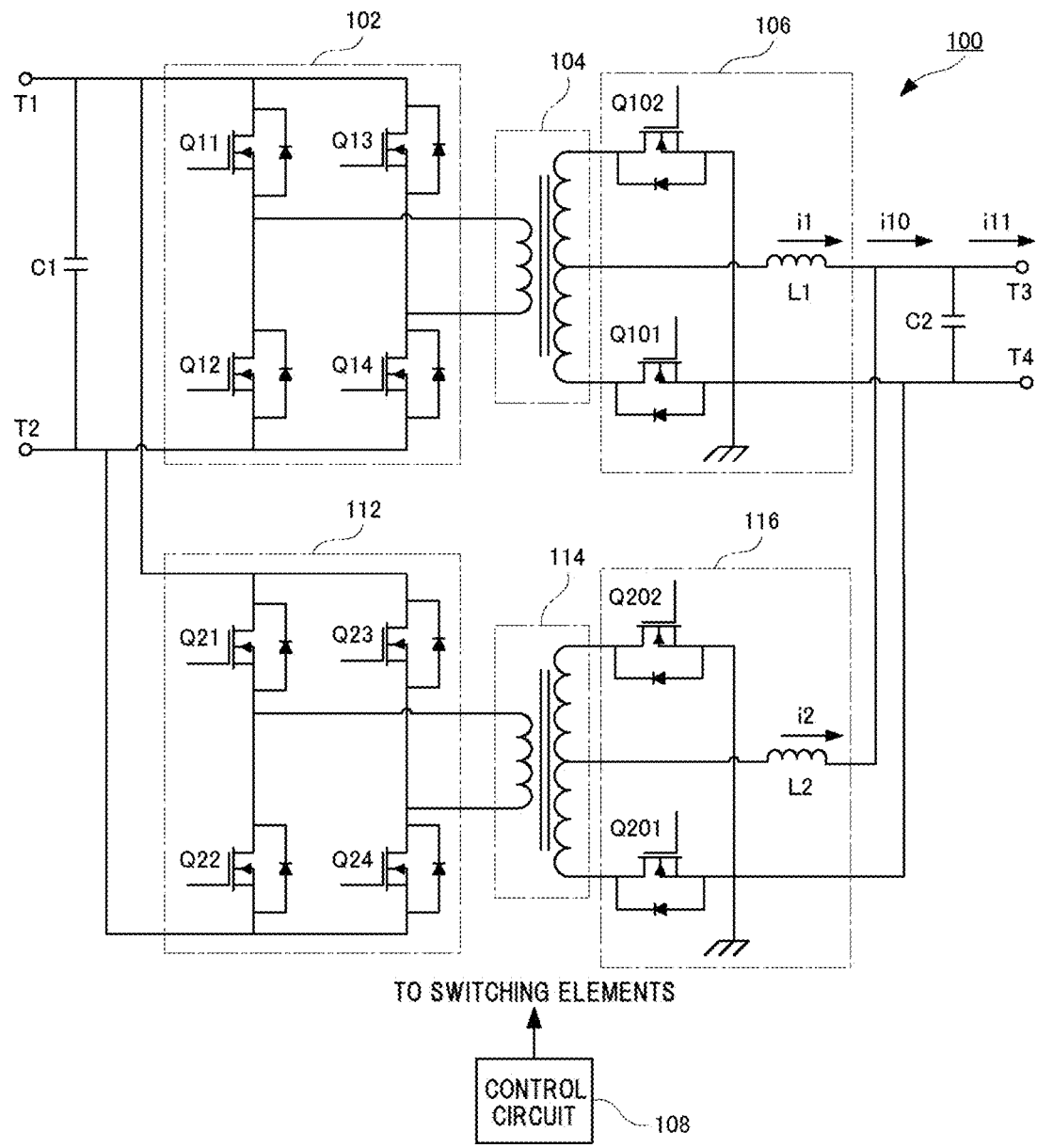
FIG. 4 is a circuit diagram illustrating a power conversion apparatus according to an embodiment of the present disclosure.

Referring to FIG. 4, a power conversion apparatus 100 according to the embodiment of the present disclosure includes full bridge circuits 102 and 112, transformers 104 and 114, rectifier circuits 106 and 116, a control circuit 108, capacitors C1 and C2, input terminals T1 and T2, and output terminals T3 and T4. The full bridge circuits 102 and 112 and the rectifier circuits 106 and 116 include switching elements as described later. The full bridge circuits 102 and 112, the transformers 104 and 114, and the rectifier circuits 106 and 116 form a single switching circuit as a whole. The full bridge circuit 102, the transformer 104, and the rectifier circuit 106 correspond to a subcircuit that has a power conversion function and that is included in the switching circuit as illustrated later. Similarly, the full bridge circuit 112, the transformer 114, and the rectifier circuit 116 correspond to a subcircuit that has a power conversion function and that is included in the switching circuit. The control circuit 108 controls and switches (also referred to below as controls so as to turn on or off) the switching elements that are included in the rectifier circuits 106 and 116 and the full bridge circuits 102 and 112. The control circuit 108 receives a trigger from the outside and outputs a control signal with a predetermined timing and can be acquired by using, for example, an ASIC (Application Specific Integrated Circuit). The control circuit 108 may serve as a control unit (a control device) that uses, for example, a CPU (Central Processing Unit) and may control and switch the switching elements of the switching circuit by using a computer program.

The full bridge circuit 102 includes switching elements Q11, Q12, Q13, and Q14. The switching elements Q11, Q12, Q13, and Q14 are included in the full bridge circuit 102 so as to be connected by bridge connection. For example, the switching elements Q11, Q12, Q13, and Q14 include FETs (Field Effect Transistors). FIG. 4 illustrates parasitic diodes (body diodes) that are formed in the FETs. The switching elements may be semiconductor elements other than the FETs, for example, semiconductor elements such as IGBTs (Insulated Gate Bipolar Transistors).

A direct current voltage is applied to the input terminals T1 and T2 from a power supply (not illustrated) outside the power conversion apparatus 100. The capacitor C1 is connected to the input terminals T1 and T2. The input terminals T1 and T2 also serve as input terminals for the full bridge circuit 102, and the direct current voltage across the input terminals T1 and T2 is applied to the full bridge circuit 102. A primary winding of the transformer 104 is connected to the output of the full bridge circuit 102. The switching elements Q11, Q12, Q13, and Q14 are controlled so as to be turned on or off by the control circuit 108. Consequently, the full bridge circuit 102 converts the direct current voltage that is applied across the input terminals T1 and T2 into an alternating current voltage and outputs the alternating current voltage to the primary winding of the transformer 104.

The transformer 104 includes a primary winding, a secondary winding, and a core (such as an iron core) that has strong magnetism. The secondary winding of the transformer 104 is a center-tapped coil in which two coils are connected in series, and a connection node thereof serves as an output terminal.

The rectifier circuit 106 includes switching elements Q101 and Q102 and an inductor L1. For example, the switching elements Q101 and Q102 include FETs. The input of the rectifier circuit 106 is connected to both terminals of the secondary winding of the transformer 104. The switching elements Q101 and Q102 are controlled so as to be turned on or off by the control circuit 108. Consequently, the rectifier circuit 106 rectifies the alternating current voltage that is applied to the secondary winding of the transformer 104. The inductor L1 functions as a choke coil, smooths the rectified electric current, and generates an electric current i1. That is, the full bridge circuit 102, the transformer 104, and the rectifier circuit 106 function as a DC-DC converter. The electric current i1 is superposed on an electric current i2 described later into an electric current i10 that is smoothed by the capacitor C2 that is connected to the output terminals T3 and T4. Consequently, an electric current i11 that is outputted from the output terminals T3 and T4 becomes a direct current having a small ripple (for example, a pulsating component contained in the direct current).

The full bridge circuit 112 and the rectifier circuit 116 have the same structure as those of the full bridge circuit 102 and the rectifier circuit 106. A circuit that includes the full bridge circuit 112, the transformer 114, and the rectifier circuit 116 is connected in parallel with a circuit that includes the full bridge circuit 102, the transformer 104, and the rectifier circuit 106 between the input terminals T1 and T2 and the output terminals T3 and T4.

The full bridge circuit 112 includes switching elements Q21, Q22, Q23, and Q24. The switching elements Q21, Q22, Q23, and Q24 are included in the full bridge circuit 112 so as to be connected by bridge connection. For example, the switching elements Q21, Q22, Q23, and Q24 include FETs. The direct current voltage across the input terminals T1 and T2 is also applied to the full bridge circuit 112. A primary winding of the transformer 114 is connected to the output of the full bridge circuit 112. The switching elements Q21, Q22, Q23, and Q24 are controlled so as to be turned on or off by the control circuit 108. Consequently, the full bridge circuit 112 converts the direct current voltage that is applied across the input terminals T1 and T2 into an alternating current voltage and outputs the alternating current voltage to the primary winding of the transformer 114.

The transformer 114 has the same structure as that of the transformer 104 and includes a primary winding, a secondary winding, and a core (such as an iron core) that has strong magnetism. The secondary winding of the transformer 114 is a center-tapped coil in which two coils are connected in series, and a connection node thereof serves as an output terminal.

The rectifier circuit 116 includes switching elements Q201 and Q202 and an inductor L2. For example, the switching elements Q201 and Q202 include FETs. The input of the rectifier circuit 116 is connected to both ends of the secondary winding of the transformer 114. The switching elements Q201 and Q202 are controlled so as be turned on or off by the control circuit 108, and the rectifier circuit 116 rectifies the alternating current voltage that is applied to the secondary winding of the transformer 114. The inductor L2 functions as a choke coil, smooths the rectified electric current, and generates the electric current i2. That is, the full bridge circuit 112, the transformer 114, and the rectifier circuit 116 function as a DC-DC converter. The electric current i2 is superposed on the electric current i1 into the electric current i10 as described above that is smoothed by the capacitor C2 and that becomes the electric current i11 having the small ripple to be outputted from the output terminals T3 and T4.

The control circuit 108 is acquired by using, for example, a semiconductor element (such as a PLD, a FPGA, or an ASIC). The control circuit 108 may be acquired by using a CPU and a memory that stores a program that is run by the CPU. Consequently, the switching elements Q11, Q12, Q13, Q14, Q21, Q22, Q23, Q24, Q101, Q102, Q201, and Q202 are controlled so as to be turned on or off as described later.

Figure 5:
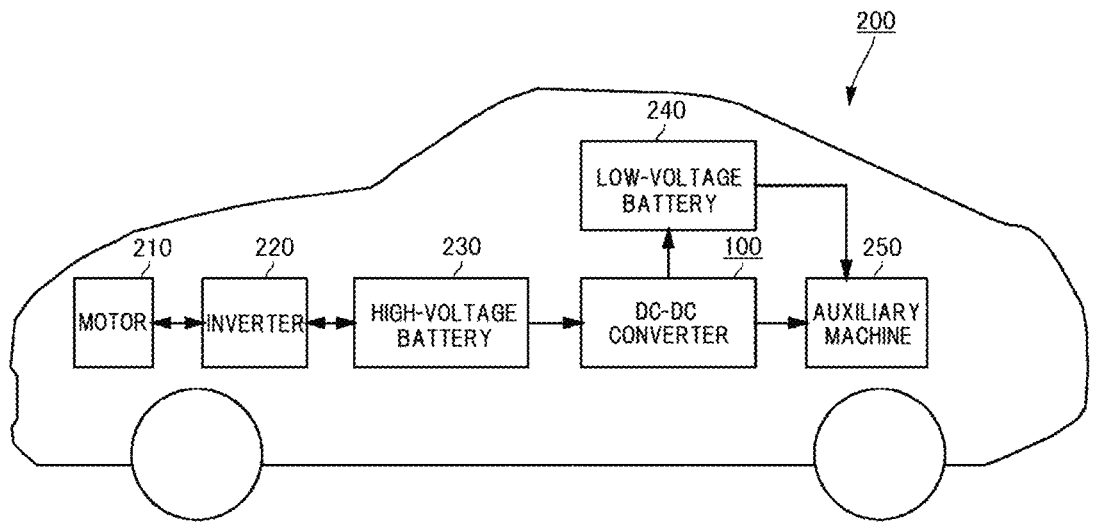
FIG. 5 schematically illustrates a vehicle according to an embodiment of the present disclosure.

With reference to FIG. 5, the power conversion apparatus 100 can be mounted in a vehicle 200 such as a PHEV or an EV. The power conversion apparatus 100 that is mounted in the vehicle 200, a high-voltage battery 230, and a low-voltage battery 240, for example, serve as a power supply unit. The output of the power (direct current) of the high-voltage battery 230 is converted into alternating current power by using an inverter 220 and is used for driving a motor 210. The power conversion apparatus 100 is used to convert voltage between the high-voltage battery 230 and the low-voltage battery 240 or an auxiliary machine system load 250. The power conversion apparatus 100 converts the output voltage of the high-voltage battery 230 into a low voltage and supplies the low voltage to the low-voltage battery 240 and the auxiliary machine system load 250. Consequently, the low-voltage battery 240 is charged, and the auxiliary machine system load 250 operates.

The power conversion apparatus 100 is also used to charge the high-voltage battery 230 and the low-voltage battery 240 by using alternating current power that is supplied from an external alternating current power supply and to supply an appropriate charge voltage to the high-voltage battery 230 and the low-voltage battery 240. The auxiliary machine system load 250 is an accessory device to cause, for example, an engine and a motor to run and includes, for example, a cell motor, an alternator, and a radiator cooling fan as main components. For example, the auxiliary machine system load 250 may include a light, a wiper-driving unit, a navigation device, and an air conditioner, a heater.

(Operation)

Figure 6:
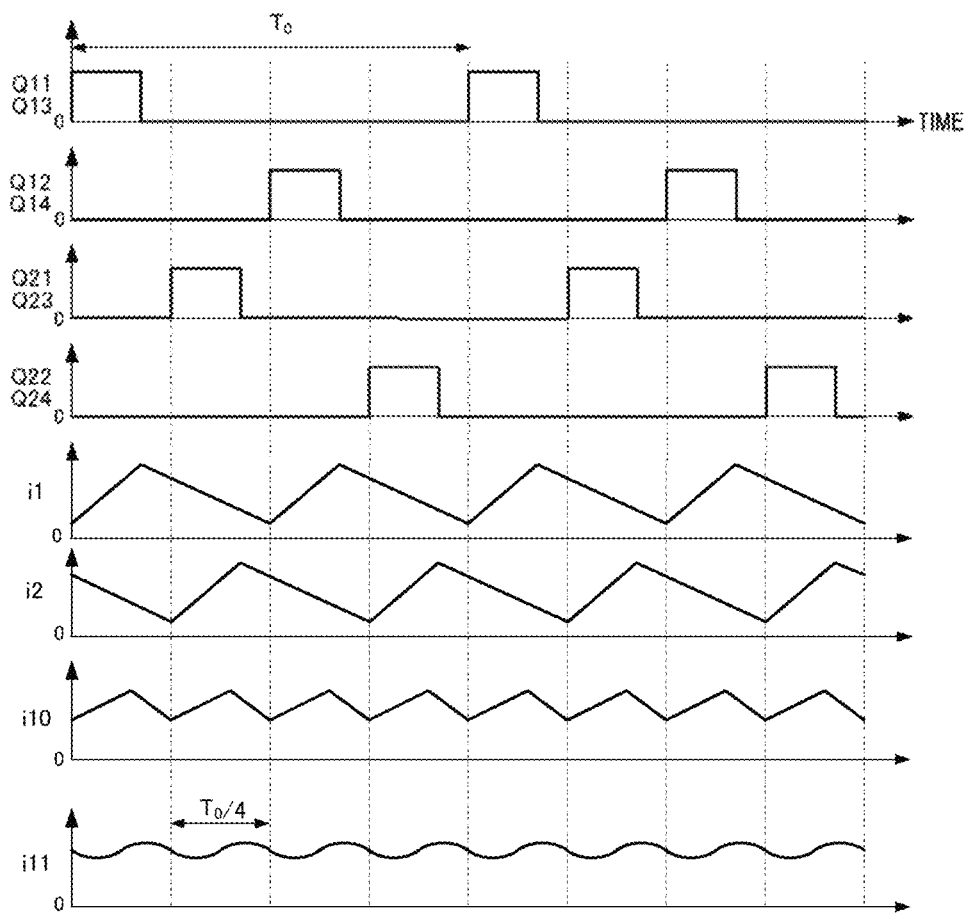
FIG. 6 illustrates a waveform representing the timing of control of a circuit illustrated in FIG. 4.

Referring to FIG. 6, the operation of the power conversion apparatus 100 will be described. In FIG. 6, the waveforms of the switching elements Q11 to Q14 and Q21 to Q24 correspond to timing charts representing variations in the signal (the output signal of the control circuit 108) for controlling the switching elements such that the switching elements are turned on or off. The horizontal axis represents time, and the vertical axis represents voltage such as the gate voltages of the FETs (a high level for turning on the FETs or a low level for turning off the FETs).

At a low part in FIG. 6, the electric currents i1, i2, i10, and i11 that are generated by control signals are illustrated. The horizontal axis represents time, and the vertical axis represents the values of the electric currents. All of the time axes are the same. That is, dotted lines in the vertical direction represent identical timings (identical time). In FIG. 6, a switching period $T_0$ associated with a switching frequency $f_0$ is illustrated.

The control signals of the switching elements Q21 to Q24 have constant time differences (phase differences) from the control signals of the switching elements Q11 to Q14. The phase differences described herein are 90 degrees. That is, control illustrated in FIG. 6 is control (referred to below as 2-phase control) in which control signals in two phases are used.

At this time, the switching elements Q101 and Q102 may not be controlled by the control circuit 108 but may be controlled by a synchronous rectification method as needed. The switching elements Q101 and Q102 are alternately turned on by controlling the gate voltages in the case where the switching elements Q101 and Q102 are controlled by the synchronous rectification method. For example, the switching element Q101 is on at least while the switching element Q11 is on. For example, the switching element Q102 is on at least while the switching element Q12 is on. Similarly, the switching elements Q201 and Q202 are alternately turned on. For example, the switching element Q201 is on at least while the switching element Q21 is on. For example, the switching element Q202 is on at least while the switching element Q22 is on.

The electric current i1 that is outputted from the rectifier circuit 106 varies as illustrated in FIG. 6 by controlling the switching elements Q11 to Q14 as illustrated in FIG. 6. Similarly, the electric current i2 that is outputted from the rectifier circuit 116 varies as illustrated in FIG. 6 by controlling the switching elements Q21 to Q24 as illustrated in FIG. 6. The electric currents i1 and i2 vary in a period equal to ½ of the period $T_0$ (the frequency is twice $f_0$). The phases differ from each other by 90 degrees. As a result, the electric current i10 that is generated by combining the electric currents i1 and i2 and the electric current i11 that is acquired by smoothing the electric current i10 and that is outputted from the output terminals T3 and T4 become electric currents that contain a ripple the main component of which is in a period equal to ¼ of the period $T_0$ (the frequency is 4 times $f_0$). The main component described herein is a frequency having the maximum amplitude among frequency components that are contained in each signal.

The switching frequency $f_0$ is preferably set to a value larger than 450 kHz and smaller than 530 kHz. This band is in a frequency band (see a first undefined region in FIG. 1) in which the limit value of the noise in CISPR 25 is not defined. In this case, the main component (4 times $f_0$) of the frequency of the ripple that is contained in the electric current i11 as described above has a value larger than 1800 kHz and smaller than 2120 kHz. Also, this band is in a frequency band (see a second undefined region in FIG. 1) in which the limit value of the noise in CISPR 25 is not defined. The frequency of the noise that is emitted from the power conversion apparatus 100 when the switching operation of the power conversion apparatus 100 is performed mainly includes the switching frequency and the frequency of the ripple superposed in an output cable that is connected to the output terminals T3 and T4. The main frequency of the noise that is emitted from the power conversion apparatus 100 with the switching frequency $f_0$ thus set is in the frequency band in which the limit value of the noise in CISPR 25 is not defined. Accordingly, the power conversion apparatus 100 can inhibit the noise that is made by the power conversion apparatus 100 from causing communication interference in a peripheral device even when the power conversion apparatus 100 includes no noise countermeasure member.

When the switching frequency is set to a frequency higher than 1800 kHz, the problem about the noise is unlikely to arise. However, a loss due to, for example, heat generation of a device increases. When the switching frequency $f_0$ is set to a value larger than 450 kHz and smaller than 530 kHz, semiconductor devices that are currently used can be effectively and safely used without increasing the loss.

The switching frequency $f_0$ is not limited to a value larger than 450 kHz and smaller than 530 kHz, provided that the switching frequency $f_0$ is in the frequency band in which the limit value is not defined in CISPR 25. A noise due to switching can be inhibited from causing the communication interference in the peripheral device by setting the switching frequency $f_0$ in the above manner even when no noise countermeasure member is provided. The switching frequency $f_0$ is more preferably set such that the frequency of the ripple higher than the switching frequency $f_0$ is in the frequency band in which the limit value is not defined in CISPR 25.

(First Modification)

Figure 7:
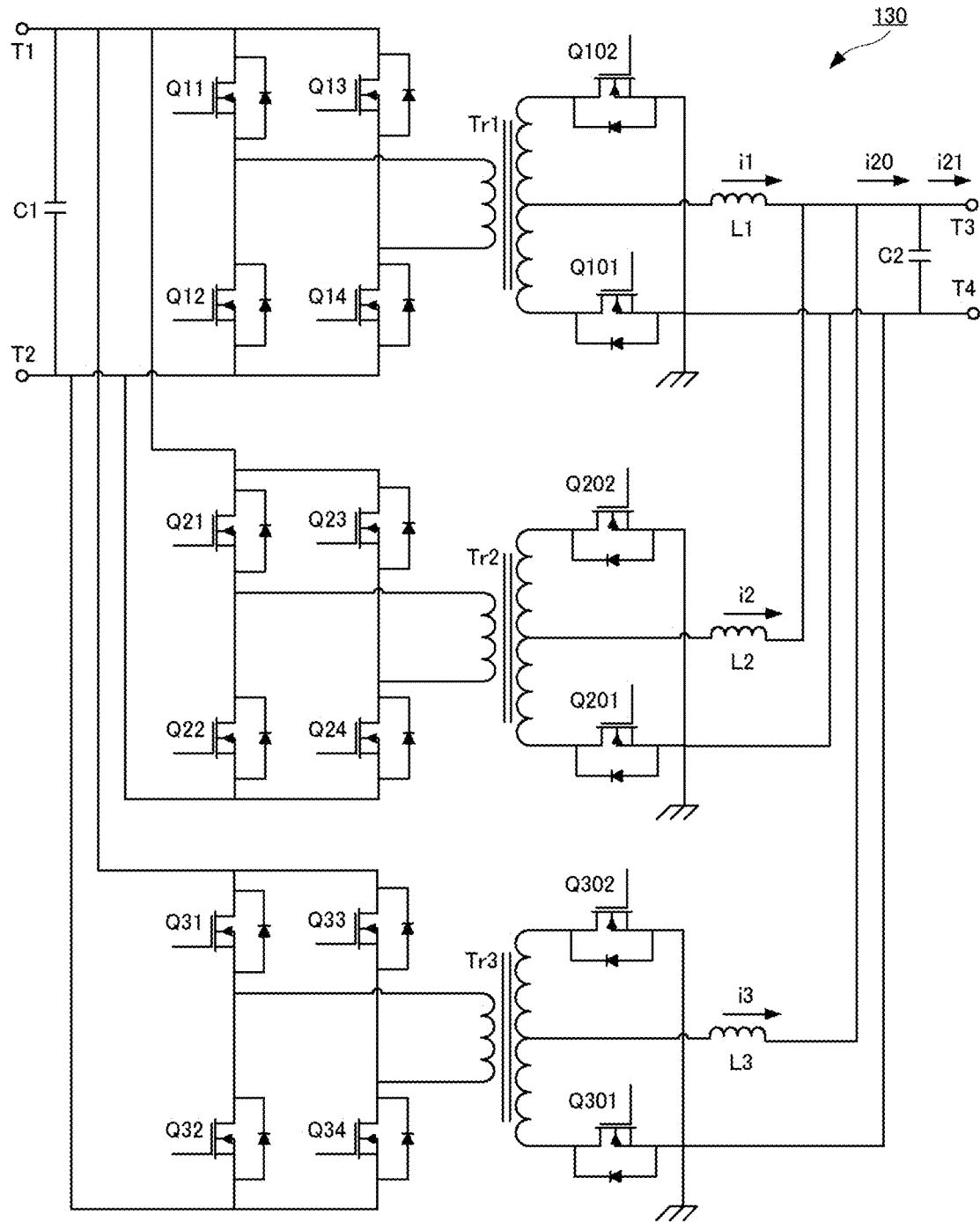
FIG. 7 is a circuit diagram illustrating a power conversion apparatus according to a first modification.

In the case described above, the power conversion apparatus includes the two subcircuits that are connected in parallel but is not limited thereto. As illustrated in FIG. 7, the power conversion apparatus may include three subcircuits.

Referring to FIG. 7, a power conversion apparatus 130 according to a first modification is acquired by adding switching elements Q31, Q32, Q33, Q34, Q301, and Q302, a transformer Tr3, and an inductor L3 into the power conversion apparatus 100 described above. In FIG. 7, the transformers 104 and 114 in FIG. 4 are illustrated as transformers Tr1 and Tr2 for convenience. In the following description, a duplicated description is not repeated, and differences from the power conversion apparatus 100 will be mainly described. The power conversion apparatus 130 includes the control circuit 108 (not illustrated in FIG. 7) that controls the switching elements such that the switching elements are turned on or off as in the power conversion apparatus 100.

The switching elements Q31, Q32, Q33, and Q34 are included in a full bridge circuit as in the full bridge circuit 102, and the output terminal thereof is connected to a primary winding of the transformer Tr3. The transformer Tr3 has the same structure as that of the transformer 104 illustrated in FIG. 4. The switching elements Q301 and Q302 and the inductor L3 are included in a rectifier circuit as in the rectifier circuit 106, and the input terminal thereof is connected to a secondary winding of the transformer Tr3.

The switching elements Q31, Q32, Q33, Q34, Q301, and Q302, the transformer Tr3, and the inductor L3 function as a DC-DC converter by being controlled so as to be turned on or off by the control circuit 108. Accordingly, the electric current i3 is superposed on the electric currents i1 and i2 into an electric current i20 that is smoothed by the capacitor C2 and that becomes an electric current i21 corresponding to a direct current having a small ripple to be outputted from the output terminals T3 and T4.

Figure 8:
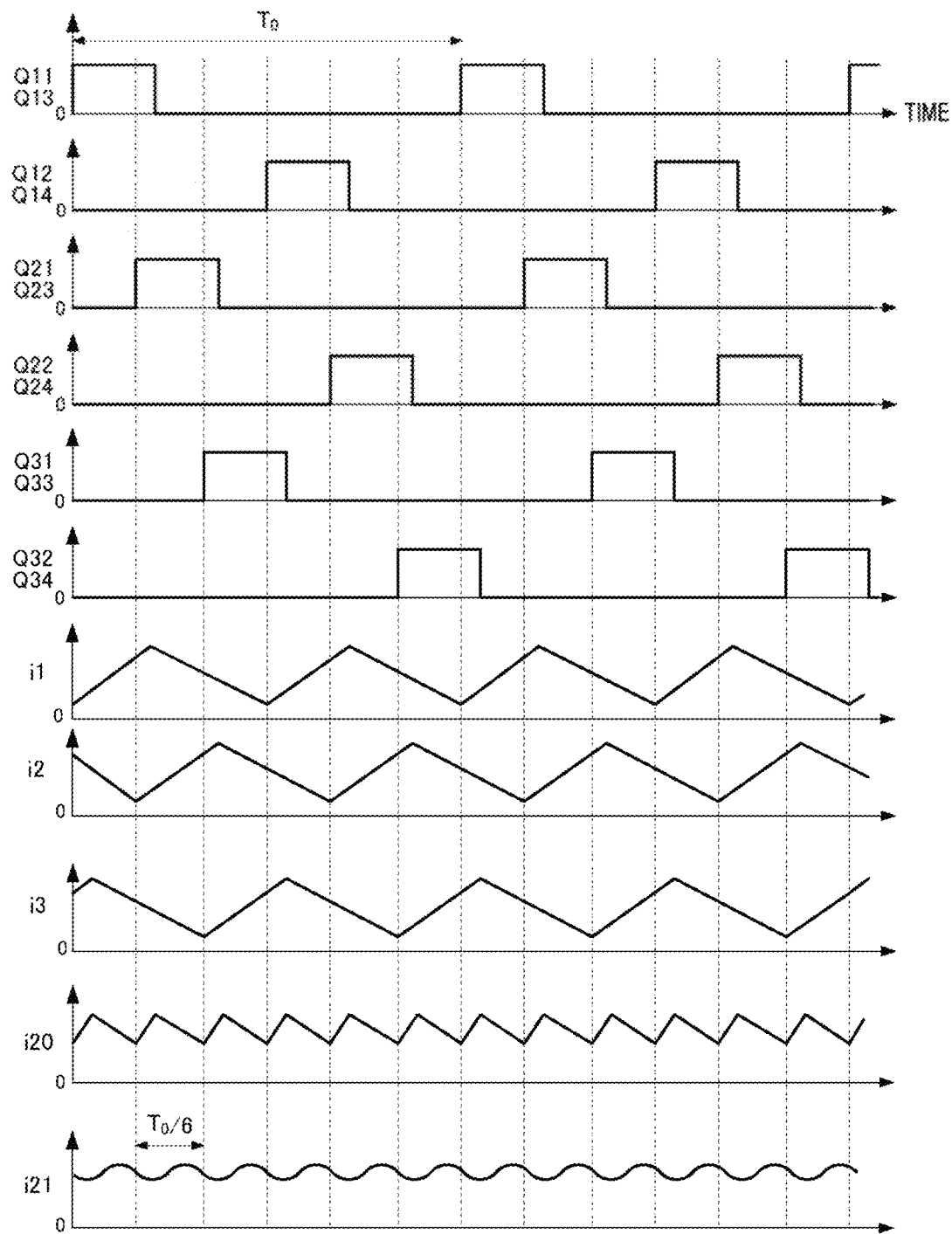
FIG. 8 illustrates a waveform representing the timing of control of a circuit illustrated in FIG. 7.

Referring to FIG. 8, the operation of the power conversion apparatus 130 will be described. FIG. 8 illustrates timing charts representing variations in the signal for controlling the switching elements Q11 to Q14, Q21 to Q24, and Q31 to Q34 illustrated in FIG. 7 such that the switching elements Q11 to Q14, Q21 to Q24, and Q31 to Q34 are turned on or off as in FIG. 6. At a low part in FIG. 8, the electric currents i1, i2, i3, i20, and i21 that are generated by the control signals are illustrated. In FIG. 8, the switching period $T_0$ associated with the switching frequency $f_0$ is illustrated.

The control signals of the switching elements Q11 to Q14, the control signals of the switching elements Q21 to Q24, and the control signals of the switching elements Q31 to Q34 have constant time differences (phase differences) from each other. The phase differences described herein are 60 degrees. That is, the control signals of the switching elements Q21 to Q24 are signals having a phase difference of 60 degrees (signals delayed at 60 degrees) with respect to the control signals of the switching elements Q11 to Q14. The control signals of the switching elements Q31 to Q34 are signals having a phase difference of 60 degrees (signals delayed at 60 degrees) with respect to the control signals of the switching elements Q21 to Q24. That is, the control signals of the switching elements Q31 to Q34 are signal having a phase difference of 120 degrees (signals delayed at 120 degrees) with respect to the control signals of the switching elements Q11 to Q14. Control illustrated in FIG. 8 is control (referred to below as 3-phase control) in which control signals in three phases are used.

At this time, the switching elements Q301 and Q302 are alternately turned on as in the switching elements Q101 and Q102. For example, the switching element Q301 is on at least while the switching element Q31 is on. For example, the switching element Q302 is on at least while the switching element Q32 is on.

The electric currents i1, i2, and i3 vary in a period equal to ½ of the period $T_0$ (the frequency is twice $f_0$) as illustrated in FIG. 8 by controlling the switching elements Q11 to Q14, Q21 to Q24, and Q31 to Q34 as illustrated in FIG. 8. The phases differ from each other by 60 degrees. As a result, the electric current i20 that is generated by combining the electric currents i1, i2, and i3 and the electric current i21 that is acquired by smoothing the electric current i20 and that is outputted from the output terminals T3 and T4 become electric currents that contain a ripple that varies in a period equal to ⅙ of the period $T_0$ (the frequency is 6 times $f_0$).

The switching frequency $f_0$ is preferably set to a value larger than 300 kHz and smaller than 530 kHz. This band is in the frequency band (see the first undefined region in FIG. 1) in which the limit value of the noise in CISPR 25 is not defined. In this case, the main component (6 times $f_0$) of the frequency of the ripple that is contained in the electric current i11 as described above has a value larger than 1800 kHz and smaller than 3180 kHz. Also, this band is in the frequency band (see the second undefined region in FIG. 1) in which the limit value of the noise in CISPR 25 is not defined. The frequency of the noise that is emitted from the power conversion apparatus 130 when the switching operation of the power conversion apparatus 130 is performed mainly includes the switching frequency and the frequency of the ripple superposed in the output cable that is connected to the output terminals T3 and T4. The main frequency of the noise that is emitted from the power conversion apparatus 130 with the switching frequency $f_0$ thus set is in the frequency band in which the limit value of the noise in CISPR 25 is not defined. Accordingly, the power conversion apparatus 130 can inhibit the noise that is made by the power conversion apparatus 130 from causing the communication interference in the peripheral device even when the power conversion apparatus 130 includes no noise countermeasure member. When the switching frequency $f_0$ is set to a value larger than 300 kHz and smaller than 530 kHz, semiconductor devices that are currently used can be effectively and safely used without increasing the loss.

The number of the subcircuits that function as the respective DC-DC converters and that are connected in parallel may be 4 or more. In the case where the number of the subcircuits that are included in the power conversion apparatus and that function as the DC-DC converters is n (an integer of 2 or more), control (referred to below as n-phase control) in which control signals in n phases are used is implemented. That is, as for the subcircuits that function as the DC-DC converters, the phases of the control signals of the associated switching elements differ from each other by 180 degrees/n.

In this case, the main component of the frequency of the ripple superposed on the electric current that is outputted from the power conversion apparatus is 2n times the switching frequency. Accordingly, the switching frequency is preferably set such that the switching frequency and a frequency equal to 2n times the switching frequency are in the frequency bands in which the limit value of the noise in CISPR 25 is not defined. In this way, the noise that is made by the power conversion apparatus can be inhibited from causing the communication interference in the peripheral device even when no noise countermeasure member is provided.

(Second Modification)

Figure 9:
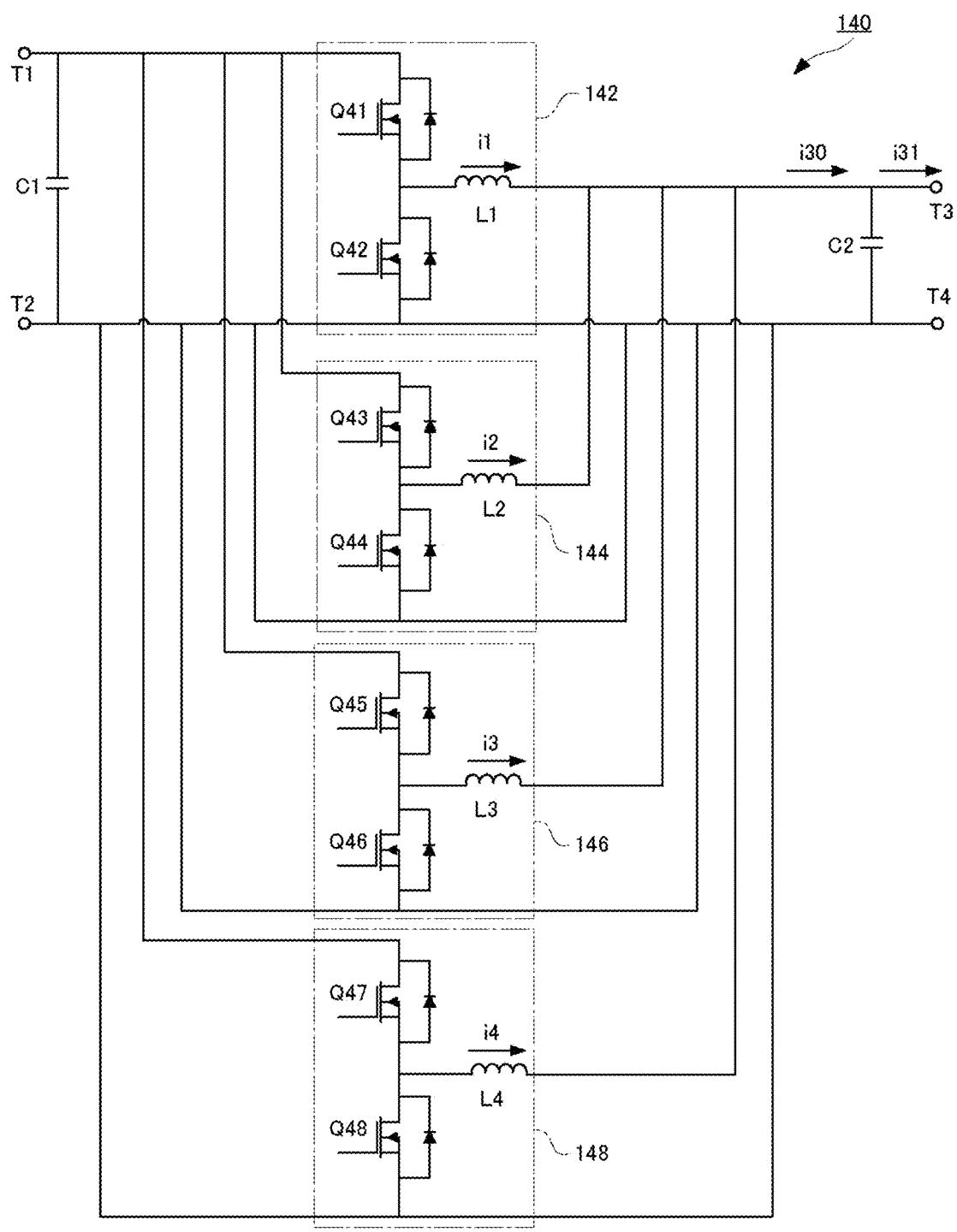
FIG. 9 is a circuit diagram illustrating a power conversion apparatus according to a second modification.

In the case described above, the subcircuits that include the full bridge circuits are connected in parallel and included in the power conversion apparatus but are not limited thereto. As illustrated in FIG. 9, non-insulating chopper circuits that use no transformers may be connected in parallel and included in the power conversion apparatus.

Referring to FIG. 9, a power conversion apparatus 140 according to a second modification includes chopper circuits 142, 144, 146, and 148, the capacitors C1 and C2, the input terminals T1 and T2, and the output terminals T3 and T4. The chopper circuits 142, 144, 146, and 148 include switching elements and are included in a single switching circuit as a whole as described later. The chopper circuits 142, 144, 146, and 148 correspond to a subcircuit that has a power conversion function and that is included in the switching circuit. The power conversion apparatus 140 includes the control circuit 108 (not illustrated in FIG. 9) that controls and switches the switching elements as in the power conversion apparatus 100.

The chopper circuit 142 includes switching elements Q41 and Q42 and the inductor L1. The source of the switching element Q41 is connected to the drain of the switching element Q42. A connection node between the switching elements Q41 and Q42 is connected to an end of the inductor L1. Similarly, the chopper circuit 144 includes switching elements Q43 and Q44 and the inductor L2. The source of the switching element Q43 is connected to the drain of the switching element Q44. A connection node between the switching elements Q43 and Q44 is connected to an end of the inductor L2. The chopper circuit 146 includes switching elements Q45 and Q46 and the inductor L3. The source of the switching element Q45 is connected to the drain of the switching element Q46. A connection node between the switching elements Q45 and Q46 is connected to an end of the inductor L3. The chopper circuit 148 includes switching elements Q47 and Q48 and an inductor L4. The source of the switching element Q47 is connected to the drain of the switching element Q48. A connection node between the switching elements Q47 and Q48 is connected to an end of the inductor L4.

The chopper circuits 142, 144, 146, and 148 are connected in parallel between the input terminals T1 and T2 and the output terminals T3 and T4 and function as respective DC-DC converters. That is, the drain of each of the switching elements Q41, Q43, Q45, and Q47 is connected to the input terminal T1. The source of each of the switching elements Q42, Q44, Q46, and Q48 is connected to the input terminal T2 and the output terminal T4. The other end of each of the inductors L1, L2, L3, and L4 is connected to the output terminal T3.

A direct current voltage is applied to the input terminals T1 and T2 from a power supply outside the power conversion apparatus 140. The capacitor C1 is connected to the input terminals T1 and T2. The input terminals T1 and T2 also serve as input terminals for the chopper circuit 142 and the direct current voltage across the input terminals T1 and T2 is applied to the chopper circuit 142. The chopper circuit 142 converts (decreases) and outputs the applied direct current voltage in a manner in which the switching elements Q41 and Q42 are controlled so as to be turned on or off as described later. The chopper circuits 144, 146, and 148 convert (decrease) and output the applied direct current voltage in a manner in which the switching elements that are included therein are controlled so as to be turned on or off as described later as in the chopper circuit 142.

Figure 10:
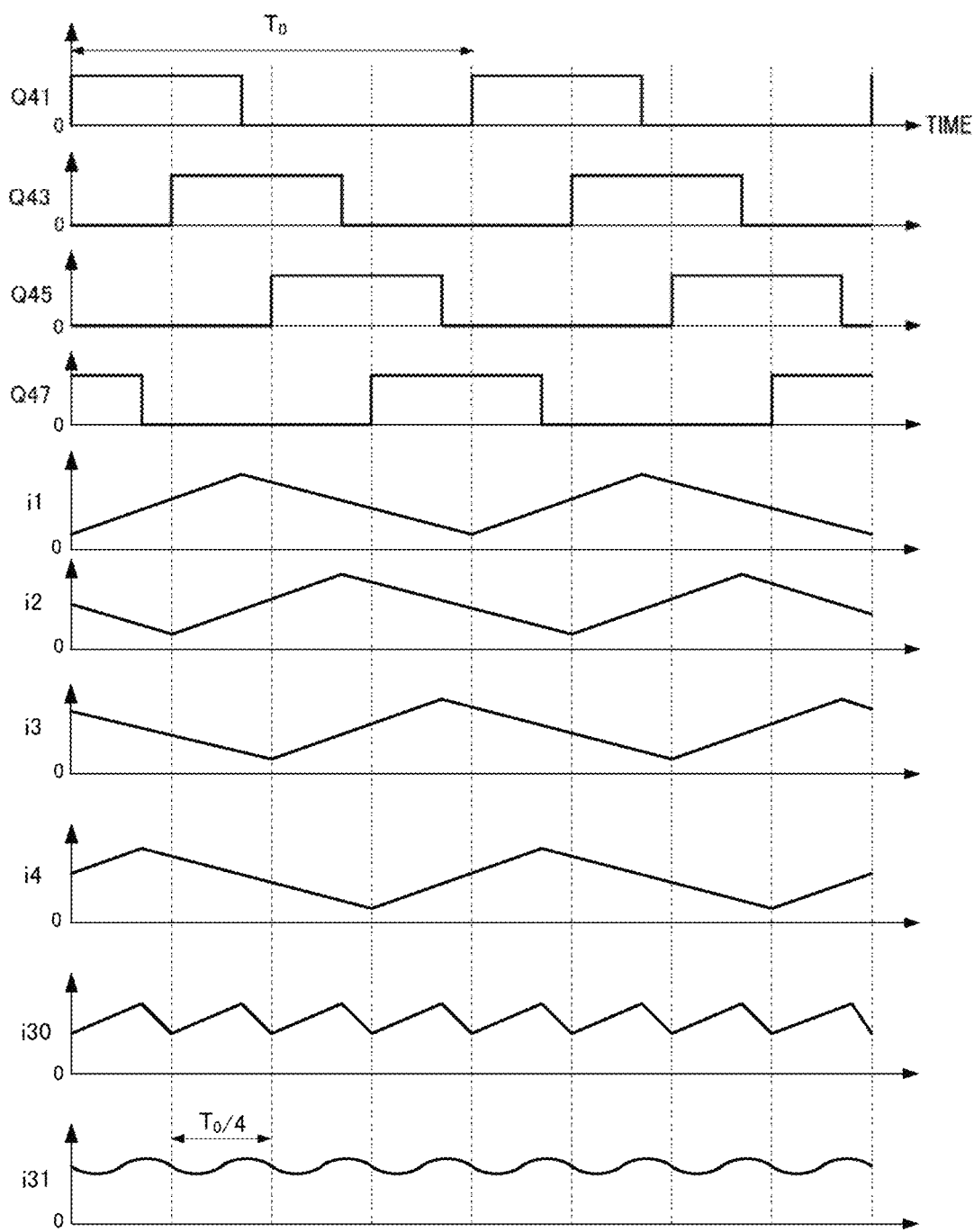
FIG. 10 illustrates a waveform representing the timing of control of a circuit illustrated in FIG. 9.

Referring to FIG. 10, the operation of the power conversion apparatus 140 will be described. FIG. 10 illustrates timing charts representing variations in the signal for controlling the switching elements Q41, Q43, Q45, and Q47 illustrated in FIG. 9 such that the switching elements Q41, Q43, Q45, and Q47 are turned on or off as in FIG. 6. At a low part in FIG. 10, the electric currents i1, i2, i3, i4, i30, and i31 that are generated by the control signals illustrated at an upper part are illustrated. In FIG. 10, the switching period $T_0$ associated with the switching frequency $f_0$ is illustrated.

The control signals of the switching elements Q41, Q43, Q45, and Q47 have constant time differences (phase differences) from each other. The phase differences described herein are 90 degrees. That is, the control signal of the switching element Q43 is a signal having a phase difference of 90 degrees (a signal delayed at 90 degrees) with respect to the control signal of the switching element Q41. The control signal of the switching element Q45 is a signal having a phase difference of 90 degrees (a signal delayed at 90 degrees) with respect to the control signal of the switching element Q43. That is, the control signal of the switching element Q45 is a signal having a phase difference of 180 degrees (a signal delayed at 180 degrees) with respect to the control signal of the switching element Q41. The control signal of the switching element Q47 is a signal having a phase difference of 90 degrees (a signal delayed at 90 degrees) with respect to the control signal of the switching element Q45. That is, the control signal of the switching element Q47 is a signal having a phase difference of 270 degrees (a signal delayed at 270 degrees) with respect to the control signal of the switching element Q41. Control illustrated in FIG. 10 is 4-phase control in which four phases are used.

At this time, the switching elements Q42, Q44, Q46, and Q48 may be always off. The switching elements Q42, Q44, Q46, and Q48 may be controlled in the synchronous rectification method so as to be turned on or off (on when the associated switching elements are off (for example, when the switching element Q41 is off, the switching element Q42 is on)).

The electric currents i1, i2, i3, and i4 vary in the period $T_0$ (the frequency $f_0$) as illustrated in FIG. 10 by controlling the switching elements Q41, Q43, Q45, and Q47 as illustrated in FIG. 10. The phases differ from each other by 90 degrees. As a result, the electric current i30 that is generated by combining the electric currents i1, i2, i3, and i4 and the electric current i31 that is acquired by smoothing the electric current i30 and that is outputted from the output terminals T3 and T4 become electric currents that contain a ripple the main component of which is in a period equal to ¼ of the period $T_0$ (the frequency is 4 times $f_0$).

The switching frequency $f_0$ is preferably set to a value larger than 450 kHz and smaller than 530 kHz as described above about FIG. 6. This band is in the frequency band (see the first undefined region in FIG. 1) in which the limit value of the noise in CISPR 25 is not defined. In this case, the main component (4 times $f_0$) of the frequency of the ripple that is contained in the electric current i31 has a value larger than 1800 kHz and smaller than 2120 kHz. Also, this band is in the frequency band (see the second undefined region in FIG. 1) in which the limit value of the noise in CISPR 25 is not defined. The frequency of the noise that is emitted from the power conversion apparatus 140 when the switching operation of the power conversion apparatus 140 is performed mainly includes the switching frequency and the frequency of the ripple superposed in the output cable that is connected to the output terminals T3 and T4. The main frequency of the noise that is emitted from the power conversion apparatus 140 with the switching frequency $f_0$ thus set is in the frequency band in which the limit value of the noise in CISPR 25 is not defined. Accordingly, the power conversion apparatus 140 can inhibit the noise that is made by the power conversion apparatus 140 from causing the communication interference in the peripheral device even when the power conversion apparatus 140 includes no noise countermeasure member. In addition, semiconductor devices that are currently used can be effectively and safely used without increasing the loss.

(Third Modification)

Figure 11:
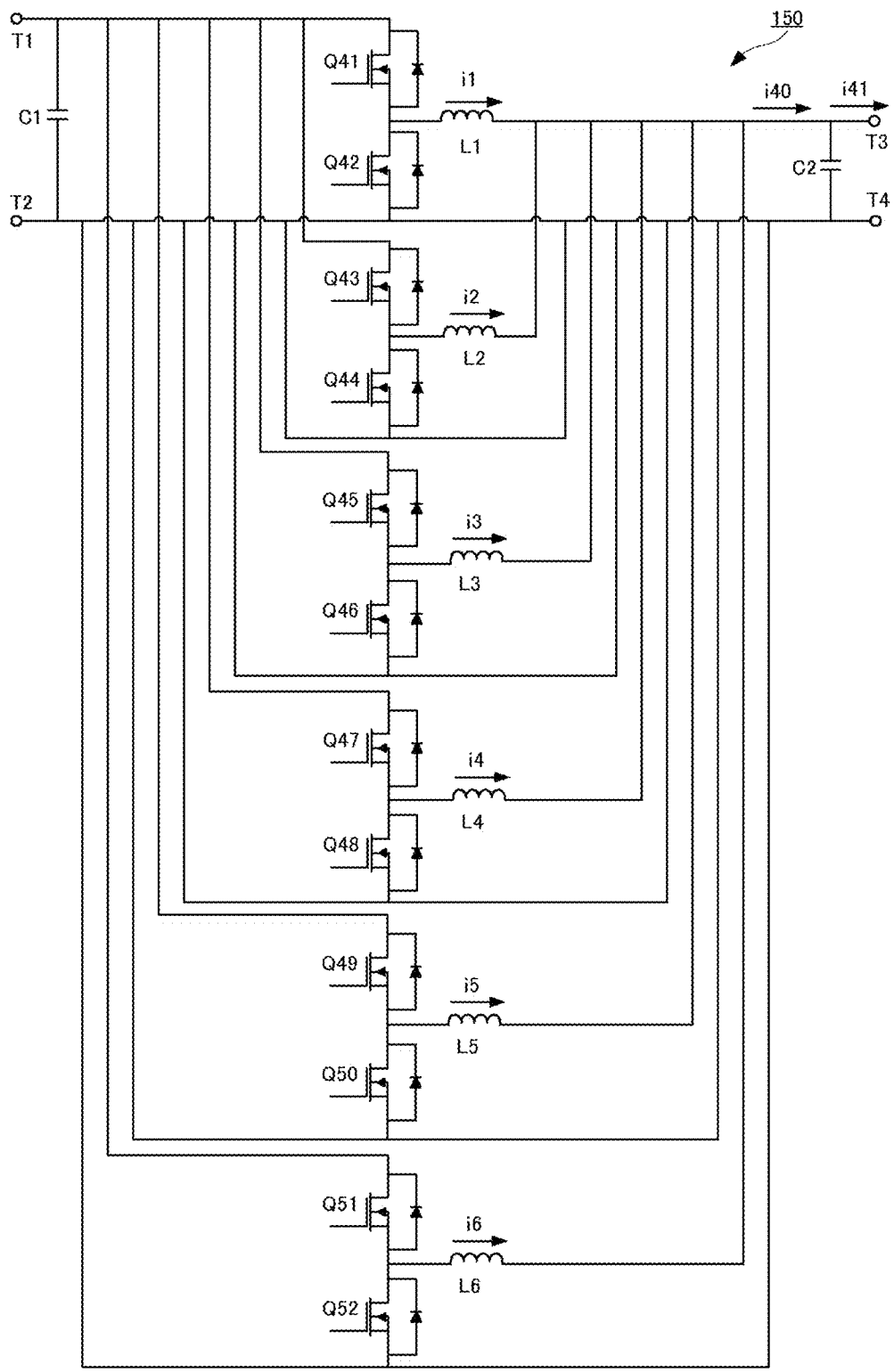
FIG. 11 is a circuit diagram illustrating a power conversion apparatus according to a third modification.

In the case described above, the four chopper circuits that are connected in parallel are included in the power conversion apparatus but are not limited thereto. As illustrated in FIG. 11, six chopper circuits may be included in the power conversion apparatus.

Referring to FIG. 11, a power conversion apparatus 150 according to a third modification is acquired by adding switching elements Q49, Q50, Q51, and Q52 and inductors L5 and L6 into the power conversion apparatus 140 described above. In the following description, a duplicated description is not repeated, and differences from the power conversion apparatus 140 will be mainly described. The power conversion apparatus 150 includes the control circuit 108 (not illustrated in FIG. 11) that controls the switching elements such that the switching elements are turned on or off as in the power conversion apparatus 100.

The switching elements Q49 and Q50 and the inductor L5 are included in a chopper circuit. The source of the switching element Q49 is connected to the drain of the switching element Q50. A connection node between the switching elements Q49 and Q50 is connected to an end of the inductor L5. Similarly, the switching elements Q51 and Q52 and the inductor L6 are included in a chopper circuit. The source of the switching element Q51 is connected to the drain of the switching element Q52. A connection node between the switching elements Q51 and Q52 is connected to an end of the inductor L6.

The six chopper circuits illustrated in FIG. 11 are connected in parallel between the input terminals T1 and T2 and the output terminals T3 and T4 and function as respective DC-DC converters. That is, a direct current voltage that is applied to the input terminals T1 and T2 from a power supply outside the power conversion apparatus 150 is applied to the six chopper circuits, and the applied direct current voltage is converted (decreased) and outputted in a manner in which the switching elements that are included in the chopper circuits are controlled so as to be turned on or off as described later.

Figure 12:
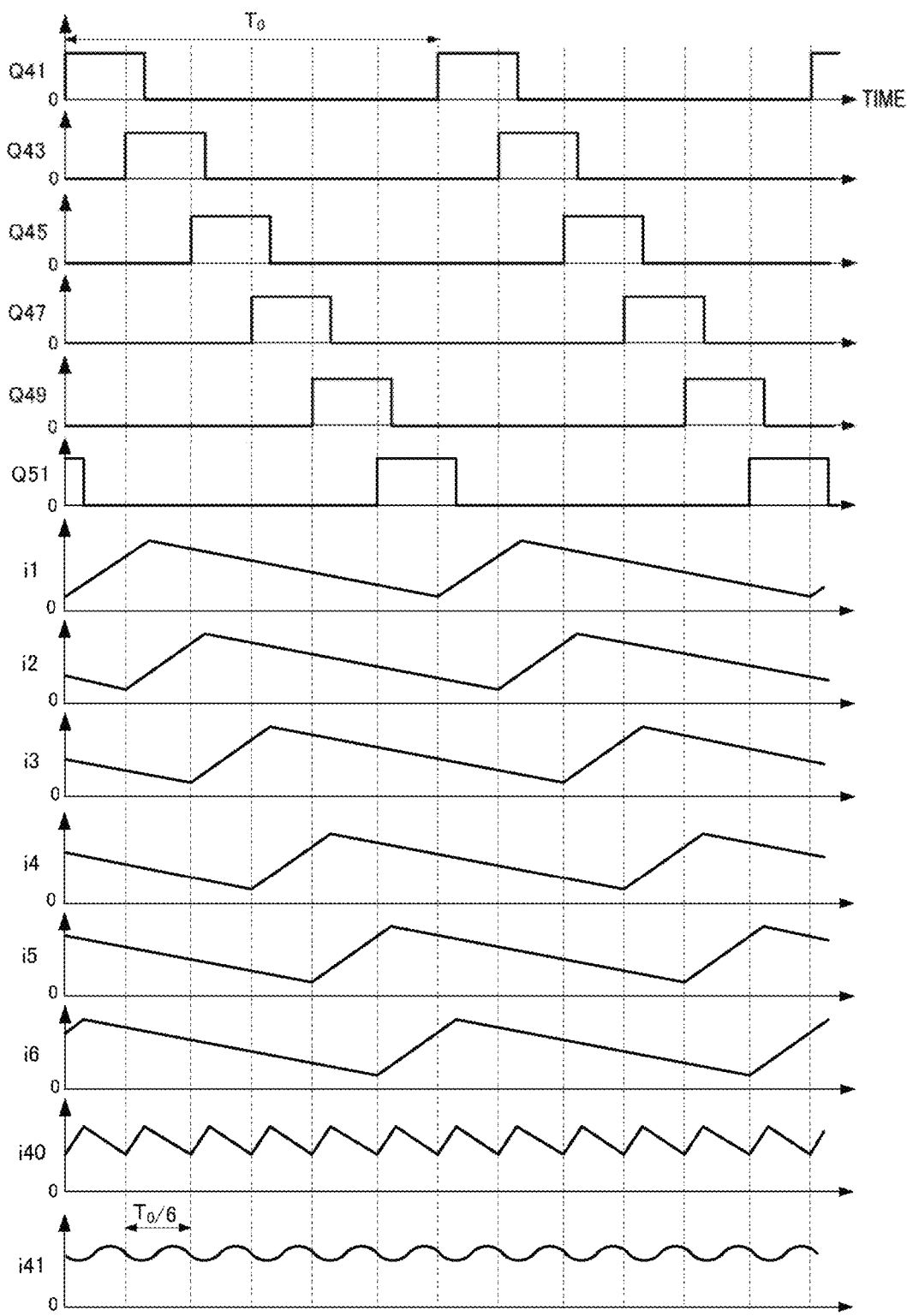
FIG. 12 illustrates a waveform representing the timing of control of a circuit illustrated in FIG. 11.

Referring to FIG. 12, the operation of the power conversion apparatus 150 will be described. FIG. 12 illustrates timing charts representing variations in the signal for controlling the switching elements Q41, Q43, Q45, Q47, Q49, and Q51 illustrated in FIG. 11 such that the switching elements Q41, Q43, Q45, Q47, Q49, and Q51 are turned on or off as in FIG. 6. At a low part in FIG. 12, the electric currents i1, i2, i3, i4, i5, i6, i40, and i41 that are generated by the control signals illustrated in an upper part are illustrated. In FIG. 12, the switching period $T_0$ associated with the switching frequency $f_0$ is illustrated.

The control signals of the switching elements Q41, Q43, Q45, Q47, Q49, and Q51 have constant time differences (phase differences) from each other. The phase differences described herein are 60 degrees. That is, the control signal of the switching element Q43 is a signal having a phase difference of 60 degrees (a signal delayed at 60 degrees) with respect to the control signal of the switching element Q41. The control signal of the switching element Q45 is a signal having a phase difference of 60 degrees (a signal delayed at 60 degrees) with respect to the control signal of the switching element Q43. That is, the control signal of the switching element Q45 is a signal having a phase difference of 120 degrees (a signal delayed at 120 degrees) with respect to the control signal of the switching element Q41. The control signal of the switching element Q47 is a signal having a phase difference of 60 degrees (a signal delayed at 60 degrees) with respect to the control signal of the switching element Q45. That is, the control signal of the switching element Q47 is a signal having a phase difference of 180 degrees (a signal delayed at 180 degrees) with respect to the control signal of the switching element Q41. The control signal of the switching element Q49 is a signal having a phase difference of 60 degrees (a signal delayed at 60 degrees) with respect to the control signal of the switching element Q47. That is, the control signal of the switching element Q49 is a signal having a phase difference of 240 degrees (a signal delayed at 240 degrees) with respect to the control signal of the switching element Q41. The control signal of the switching element Q51 is a signal having a phase difference of 60 degrees (a signal delayed at 60 degrees) with respect to the control signal of the switching element Q49. That is, the control signal of the switching element Q51 is a signal having a phase difference of 300 degrees (a signal delayed at 300 degrees) with respect to the control signal of the switching element Q41. Control illustrated in FIG. 12 is 6-phase control in which six phases are used.

At this time, the switching elements Q42, Q44, Q46, Q48, Q50, and Q52 may be always off. The switching elements Q42, Q44, Q46, Q48, Q50, and Q52 may be controlled in the synchronous rectification method so as to be turned on or off.

The electric currents i1, i2, i3, i4, i5, and i6 vary in the period $T_0$ (the frequency $f_0$) as illustrated in FIG. 12 by controlling the switching elements Q41, Q43, Q45, Q47, Q49, and Q51 as illustrated in FIG. 12. The phases differ from each other by 60 degrees. As a result, the electric current i40 that is generated by combining the electric currents i1, i2, i3, i4, i5, and i6 and the electric current i41 that is acquired by smoothing the electric current i40 and that is outputted from the output terminals T3 and T4 become electric currents that contain a ripple the main component of which is in a period equal to ⅙ of the period $T_0$ (the frequency is 6 times $f_0$).

The switching frequency $f_0$ is preferably set to a value larger than 300 kHz and smaller than 530 kHz as described above about FIG. 8. This band is in the frequency band (see the first undefined region in FIG. 1) in which the limit value of the noise in CISPR 25 is not defined. In this case, the frequency (6 times $f_0$) of the ripple that is contained in the electric current i41 has a value larger than 1800 kHz and smaller than 3180 kHz. Also, this band is in the frequency band (see the second undefined region in FIG. 1) in which the limit value of the noise in CISPR 25 is not defined. The frequency of the noise that is emitted from the power conversion apparatus 150 when the switching operation of the power conversion apparatus 150 is performed mainly includes the switching frequency and the frequency of the ripple superposed in the output cable that is connected to the output terminals T3 and T4. Accordingly, the main frequency of the noise that is emitted from the power conversion apparatus 150 with the switching frequency $f_0$ thus set is in the frequency band in which the limit value of the noise in CISPR 25 is not defined. Accordingly, the power conversion apparatus 150 can inhibit the noise that is made by the power conversion apparatus 150 from causing the communication interference in the peripheral device even when the power conversion apparatus 150 includes no noise countermeasure member. In addition, semiconductor devices that are currently used can be effectively and safely used without increasing the loss.

The number of the chopper circuits that function as the respective DC-DC converters and that are connected in parallel is 2 or more. In the case where the number of the subcircuits that are included in the power conversion apparatus and that function as the DC-DC converters is m (an integer of 2 or more), m-phase control in which control signals in m phases are used is implemented. That is, as for the chopper circuits that function as the DC-DC converters, the phases of the control signals of the associated switching elements differ from each other by 360 degrees/m.

In this case, the frequency of the ripple superposed on the electric current that is outputted from the power conversion apparatus is m times the switching frequency. Accordingly, the switching frequency is preferably set such that the switching frequency and a frequency equal to m times the switching frequency are in the frequency bands in which the limit value of the noise in CISPR 25 is not defined. In this way, the noise that is made by the power conversion apparatus can be inhibited from causing the communication interference in the peripheral device even when no noise countermeasure member is provided.

(Fourth Modification)

The choke coils that are used by the chopper circuits that are included in the power conversion apparatus may be magnetically coupled. The power conversion apparatus according to a fourth modification uses the magnetically coupled choke coils.

Figure 13:
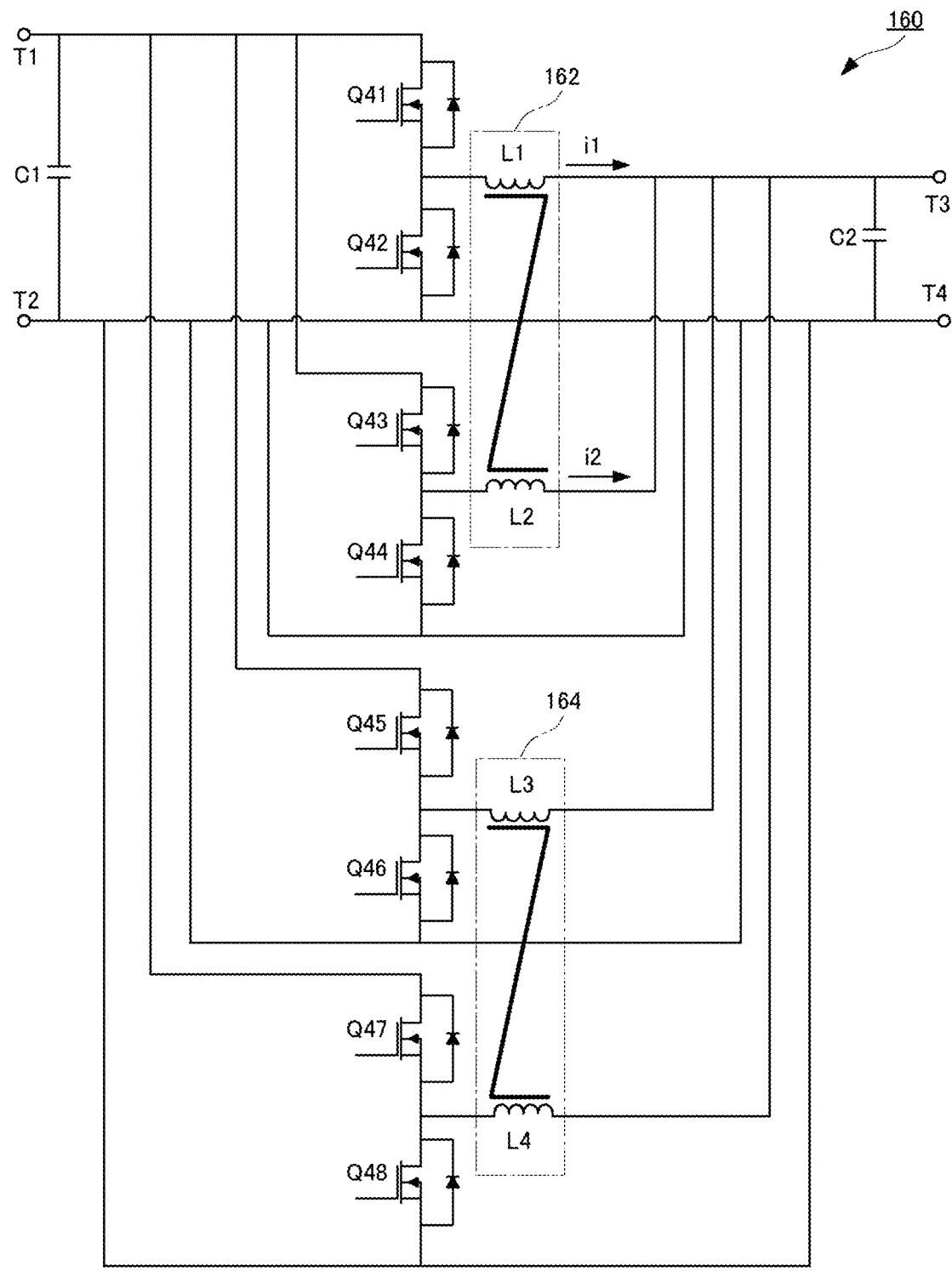
FIG. 13 is a circuit diagram illustrating a power conversion apparatus according to a fourth modification.

Referring to FIG. 13, a power conversion apparatus 160 according to a fourth modification includes magnetic coupling choke coils 162 and 164. The power conversion apparatus 160 is acquired by magnetically coupling the inductors L1 and L2 and magnetic coupling the inductors L3 and L4 in the power conversion apparatus 140 illustrated in FIG. 9. The windings of the inductors L1 and L2 that are included in the magnetic coupling choke coil 162 are wound around a core (such as an iron core) that has strong magnetism such that magnetic flux that is formed by the electric currents i1 and i2 that flows through the windings is canceled out. That is, the inductors L1 and L2 are coupled so as to have opposite polarities. Similarly, the inductors L3 and L4 that are included in the magnetic coupling choke coil 164 are coupled so as to have opposite polarities.

The control signals of the switching elements that are included in the power conversion apparatus 160 and the waveforms of the electric currents that are generated by the control signals are the same as those in FIG. 10. Accordingly, the power conversion apparatus 160 can inhibit the noise that is made by the power conversion apparatus 160 from causing the communication interference in the peripheral device by setting the switching frequency $f_0$ as in the second modification even when the power conversion apparatus 160 includes no noise countermeasure member. In addition, semiconductor devices that are currently used can be effectively and safely used without increasing the loss.

The sizes of the choke coils can be decreased by magnetic coupling. Accordingly, the power conversion apparatus 160 is advantageous in having a size smaller than that of the power conversion apparatus 140 illustrated in FIG. 9. It is not necessary to pair and magnetically couple all of the inductors as illustrated in FIG. 13, provided that at least a pair of the inductors are magnetically coupled.

In the case described above, the switching elements that are included in the power conversion apparatuses are N-type FETs. However, this is not a limitation. The full bridge circuits, the rectifier circuits, and the chopper circuits that are included in the power conversion apparatuses may use P-type FETs.

The switching elements described above are preferably wide-bandgap semiconductor elements such as SiC or GaN elements but may be FETs manufactured by using Si semiconductors that are currently used widely. A wide-bandgap semiconductor element enables the thickness of a semiconductor for ensuring pressure resistance to be less than that of a Si semiconductor element. Accordingly, the loss can be reduced even when a switching speed increases, and the switching frequency increases.

The inductors L1 and L2 that function as the choke coils, for example, may have a typical winding structure but preferably has a clamp structure. The clamp structure means a structure in which multiple magnetic cores (such as ferrite) are combined and mounted in an extension direction thereof around a linear conductive member that does not form a closed loop surrounding magnetic flux. Examples of the clamp structure are illustrated in FIG. 14 to FIG. 17.

Figure 14:
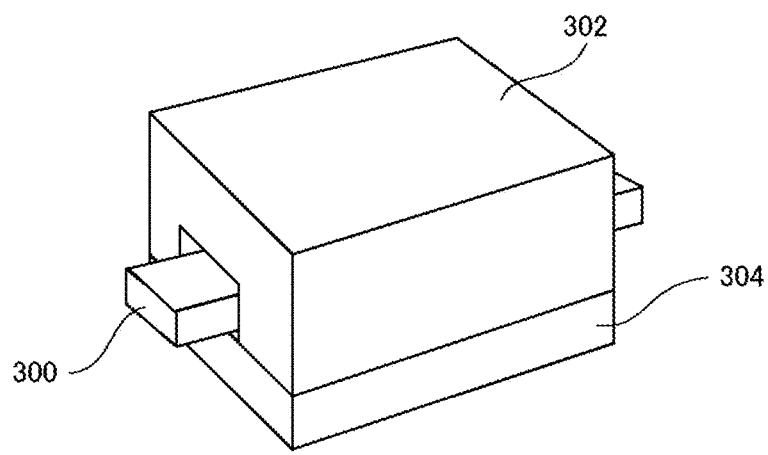
FIG. 14 illustrates a perspective view of an example of a choke coil that is used in a power conversion apparatus.
Figure 15:
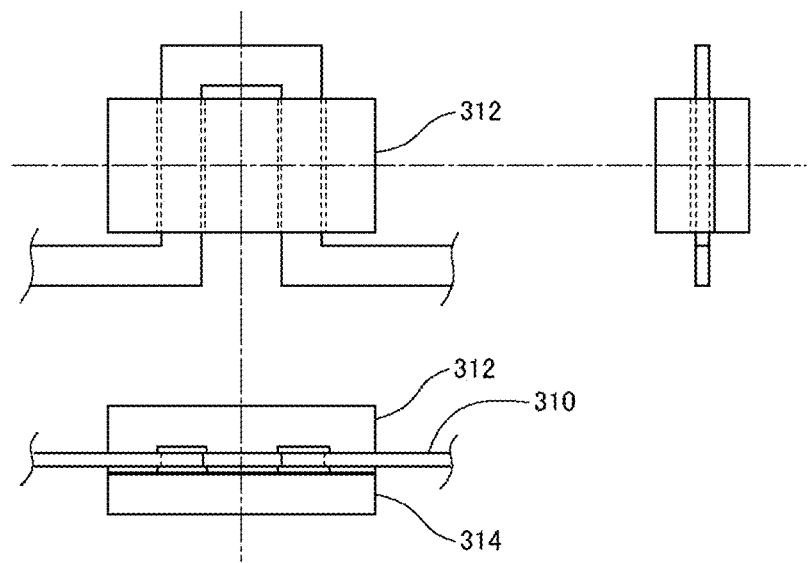
FIG. 15 illustrates three views of another example of a choke coil that is used in a power conversion apparatus.
Figure 16:
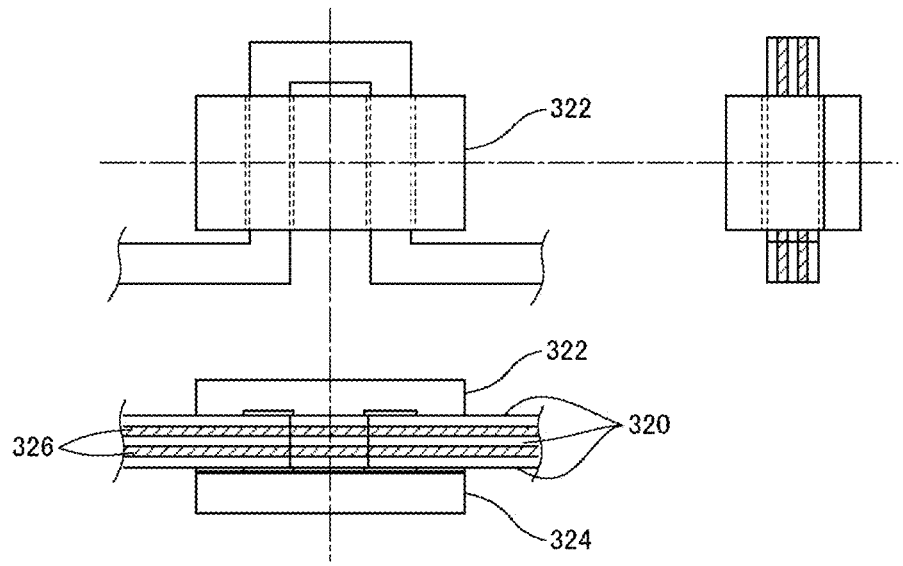
FIG. 16 illustrates three views of another example of a choke coil that is used in a power conversion apparatus.

FIG. 14 illustrates a magnetic member 302 having a U-shaped section and a magnetic member 304 having a flat plate shape that are mounted around a wiring member 300 that is coated with an electrical insulator. FIG. 15 illustrates a magnetic member 312 having an E-shaped section and a magnetic member 314 having a flat plate shape that are mounted around a conductive member 310 that is formed into a crank shape in a plan view by using a conductive member having a flat plate shape. The surface of the conductive member 310 is coated with an electrical insulator (for example, a resin coating). FIG. 16 illustrates a magnetic member 322 having an E-shape and a magnetic member 324 having a flat plate shape that are mounted around a structure in which conductive members 320 (three conductive members in FIG. 16) having the same crank shape as that in FIG. 15 are insulated with insulating members 326 interposed therebetween and stacked. First end portions of the multiple conductive members 320 are connected to each other, and second end portions of the multiple conductive members 320 are connected to each other. The exposed surfaces of the conductive members 320 (surfaces that are not in contact with the insulating members 326) are coated with an insulator.

The conductive member 310 illustrated in FIG. 15 can be manufactured, for example, by a punching process on a copper plate having a predetermined thickness. Similarly, the conductive members 320 and the insulating members 326 illustrated in FIG. 16 can be manufactured, for example, by a punching process on a copper-clad laminate having a predetermined thickness. Accordingly, coils having the clamp structures illustrated in FIG. 15 and FIG. 16 can be more readily manufactured than a coil having a winding structure. The use of the coils having the clamp structures makes it easy to manufacture a power conversion apparatus in which circuits that function as DC-DC converters are connected in parallel.

Figure 17:
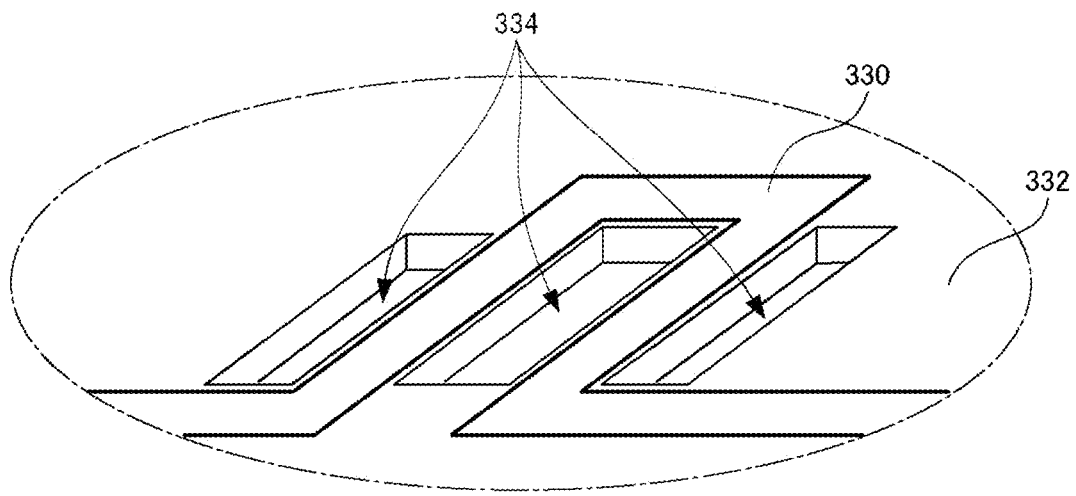
FIG. 17 illustrates a perspective view of an example in which a choke coil is formed on a circuit substrate.

The coils illustrated in FIG. 15 and FIG. 16 can be formed on a printed circuit board (a single layer or multiple layers) on which the switching elements are mounted. FIG. 17 illustrates a state in which multiple through-holes 334 are formed around a conductive member 330 that is formed on a surface of a substrate 332 by, for example, etching. A magnetic member having an E-shaped section (such as the magnetic member 322) is inserted into the multiple through-holes 334 from above the substrate 332, and a magnetic member having a flat plate shape (such as the magnetic member 324) is disposed from a position in front of the back of the substrate 332. Consequently, the coils illustrated in FIG. 15 and FIG. 16 can be manufactured. Accordingly, the size of a power conversion apparatus in which circuits that function as DC-DC converters are connected in parallel can be decreased, and manufacturing is more readily completed.

When the switching frequency is higher than 300 kHz as described above, inductance needed for the choke coils is smaller than that in the case where a switching frequency of about 100 kHz that is usually used is used. Accordingly, the coils having the clamp structures can be used for the power conversion apparatus, the size of the power conversion apparatus can be consequently decreased, and the power conversion apparatus is readily manufactured. The magnetic members are not essential. There is a case that needs a relatively small inductance and that can be achieved only by using a conductive member, depending on the switching frequency. In this case, the magnetic members are not needed.

Figure 18:
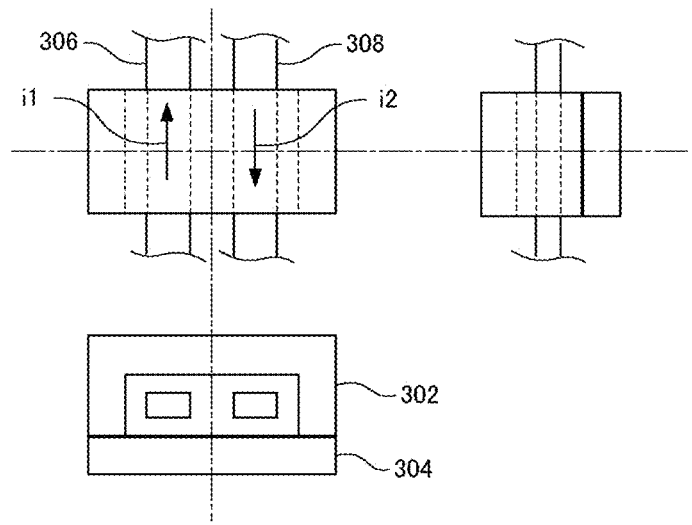
FIG. 18 illustrates three views of an example of a choke coil that is magnetically coupled.

The coils having the clamp structures may be magnetically coupled as illustrated in FIG. 13. For example, the inductors L1 and L2 that are magnetically coupled as illustrated in FIG. 13 can be formed by using the inductor having the clamp structure as illustrated in FIG. 14. As illustrated in FIG. 18, conductors 306 and 308 that are coated with an insulator are disposed so as to be adjacent to each other in a tube body that is formed by the magnetic member 302 having a U-shaped section and the magnetic member 304 having a flat plate shape and conduct the electric currents i1 and i2 in opposite directions.

Figure 19:
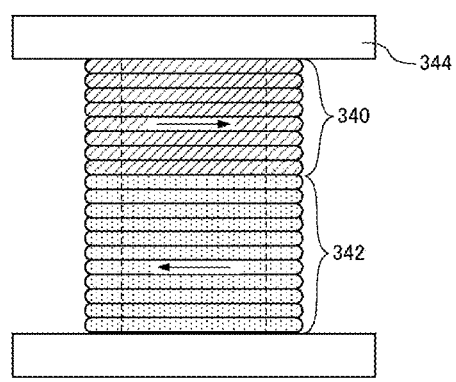
FIG. 19 is a front view of a transformer that is used in a power conversion apparatus.
Figure 20:
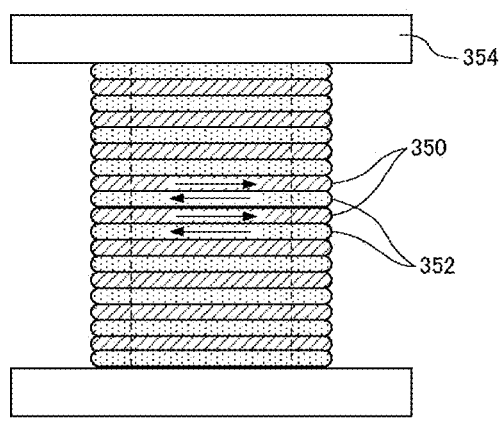
FIG. 20 is a front view of a transformer that is used in a power conversion apparatus and that has a low loss.

The transformers that are used for the circuits illustrated in FIG. 4 and FIG. 7 may have a structure in which the primary winding and the secondary winding are separately disposed as illustrated in FIG. 19 but preferably have a structure in which the primary winding and the secondary winding are disposed so as to be alternate as illustrated in FIG. 20. As for a transformer illustrated in FIG. 19, a primary winding 340 and a secondary winding 342 are separated and wound around a core 344. Arrows in left-right directions represent the directions of electric currents that flow through the primary winding 340 and the secondary winding 342. As for a transformer illustrated in FIG. 20, a primary winding 350 and a secondary winding 352 are disposed so as to be alternate and wound around a core 354. Arrows in left-right directions represent the directions of electric currents that flow through the primary winding 350 and the secondary winding 352. The primary winding and the secondary winding are thus disposed so as to be alternate and adjacent to each other, and the electric currents are conducted in opposite directions through the primary winding and the secondary winding. Consequently, magnetic flux that is formed by the primary winding and the secondary winding can be canceled out. Accordingly, an eddy current loss that becomes a problem when the transformers are used at a high frequency can be reduced, and an iron loss can be reduced. When the loss ratio of the transformer in FIG. 19 is, for example, 1.0, the loss ratio of the transformer illustrated in FIG. 20 is, for example, 0.2 and is smaller than that.

At least a winding portion of the primary winding or the secondary winding is disposed between adjacent winding portions of the other of the primary winding or the secondary winding. The primary winding and the secondary winding may be wound such that one turn of the primary winding and one turn of the secondary winding are adjacent to each other. In this case, one turn corresponds to a single winding portion. The primary winding and the secondary winding may be wound such that multiple turns of the primary winding and multiple turns of the secondary winding are adjacent to each other. In this case, multiple turns correspond to a single winding portion. The primary winding and the secondary winding are not limited to the case where each of the primary winding and the secondary winding is formed by winding a single conductive wire. Each of the primary winding and the secondary winding may be formed by winding multiple conductive wires such as a bifilar winding or a trifilar winding (the multiple conductive wires are connected in parallel). Also, in this case, the primary winding and the secondary winding can be formed so as to be adjacent to each other.

Each power conversion apparatus described above is preferably covered by a conductive member (such as metal). A noise due to a ripple (a frequency that is an integer multiple of the switching frequency) superposed on the electric current that is outputted from the output terminals T3 and T4 of the power conversion apparatus via, for example, the output cable can be inhibited from causing the communication interference in the peripheral device as described above. However, there is a possibility that a signal at a frequency between the switching frequency and the frequency of the ripple is generated in the power conversion apparatus, and the radiation noise consequently made causes the communication interference in the peripheral device. The noise that is made in the power conversion apparatus can be inhibited from being emitted to the outside in a manner in which the power conversion apparatus is covered by a conductive member (a container) except for an input portion and an output portion of the power conversion apparatus.

The power supply of each power conversion apparatus is freely determined. In the case where the power conversion apparatus 100 is mounted in a vehicle, however, preferable power supply is, for example, 1 kW or more. The electric current that is outputted from the output terminals T3 and T4 is freely determined. In the case where the power conversion apparatus 100 is mounted in a vehicle (in the case where the power conversion apparatus 100 is used, for example, for supplying a low voltage (for example, 12V or 48V)), a preferable electric current is, for example, 50 A or more.

In the case described above, the switching frequency $f_0$ is set to a frequency in the frequency band in which the limit value of the noise in CISPR 25 is not defined but is not limited thereto, provide that at least the switching frequency $f_0$ is set to a frequency out of the frequency range that is used for communication with the vehicle-mounted receiver to prevent the switching operation of the power conversion apparatus from causing communication interference in the vehicle-mounted receiver. The main frequency component of the ripple of the electric current that is outputted from the power conversion apparatus is preferably out of the frequency range that is used for the communication with the vehicle-mounted receiver. That is, to achieve this, the switching frequency $f_0$ is preferably set depending on the switching circuit that is used in the power conversion apparatus.

The present disclosure is described above by describing the embodiment. However, the embodiment is described above by way of example, and the present disclosure is not limited to the embodiment described above. The scope of the present disclosure is shown by claims in consideration of the detailed description of the invention and includes all modifications having the equivalent meaning and scope to those of wording recited therein.

REFERENCE SIGNS LIST 100, 130, 140, 150, 160 power conversion apparatus
102, 112 full bridge circuit
104, 114, Tr1, Tr2, Tr3 transformer
106, 116 rectifier circuit
108 control circuit
142, 144, 146, 148 chopper circuit
162, 164 magnetic coupling choke coil
200 vehicle
210 motor
220 inverter
230 high-voltage battery
240 low-voltage battery
250 auxiliary machine system load
300 wiring member
306, 308, 310, 320, 330 conductive member
302, 304, 312, 314, 322, 324 magnetic member
326 insulating member
334 through-hole
332 substrate
340, 350 primary winding
342, 352 secondary winding
344, 354 core
C1, C2 capacitor
i1, i2, i3, i4, i5, i6, i10, i11, i20, i21, i30, i31, i40, i41 electric current
L1, L2, L3, L4, L5, L6 inductor
Q11, Q12, Q13, Q14, Q21, Q22, Q23, Q24, Q31, Q32, Q33, Q34, Q41, Q42, Q43, Q44, Q45, Q46, Q47, Q48, Q49, Q50, Q51, Q52, Q101, Q102, Q201, Q202, Q301, Q302 switching element
T1, T2 input terminal
T3, T4 output terminal

The invention claimed is:

1. A power conversion apparatus comprising:
a switching circuit including multiple switching elements; and
a control circuit configured to control and switch the multiple switching elements included in the switching circuit at a predetermined switching frequency with a direct current voltage applied to an input terminal of the switching circuit,
wherein the switching circuit is configured to convert the direct current voltage applied to the input terminal and to output a converted electric current,
wherein the switching frequency is set such that the switching frequency and a main frequency component of a ripple occurring in the electric current are out of a frequency range used for communication with a vehicle-mounted receiver,
wherein the switching frequency is higher than 300 kHz and is lower than 530 kHz, and
wherein the main frequency component of the ripple is higher than 1800 kHz and is lower than 5900 kHz.

2. The power conversion apparatus according to claim 1, wherein the switching frequency is higher than 450 kHz and is lower than 530 KHz.

3. The power conversion apparatus according to claim 1, wherein the switching circuit includes multiple subcircuits including the multiple switching elements and connected in parallel,
wherein each of the multiple subcircuits is configured to receive the direct current voltage applied from the input terminal and
output a signal generated by converting the direct current voltage received by the subcircuit,
wherein the switching elements included in the multiple subcircuits are controlled and switched by the control circuit such that the signals outputted from the respective multiple subcircuits have a predetermined phase difference from each other, and
wherein the phase difference is a value based on a predetermined angle and a number of the multiple subcircuits.

4. The power conversion apparatus according to claim 3, wherein each of the multiple subcircuits includes a full bridge circuit including the switching element included in the subcircuit, or
wherein each of the multiple subcircuits includes a chopper circuit including the switching element included in the subcircuit.

5. The power conversion apparatus according to claim 3, wherein each of the multiple subcircuits further includes an inductor configured to smooth the signal to be outputted from the subcircuit and to output a smooth signal,
wherein the inductor has a clamp structure including a linear conductive member configured not to form a closed loop surrounding magnetic flux and a magnetic member disposed around the conductive member, and
wherein the conductive member is formed so as not to surround magnetic flux formed when an electric current flows through the conductive member.

6. The power conversion apparatus according to claim 5, wherein the conductive member includes multiple linear members,
wherein the inductor further includes an insulating member disposed between the multiple linear members,
wherein the multiple linear members and the insulating member form a multilayer structure,
wherein first end portions of the multiple linear members close to each other are connected to each other, and
wherein second end portions of the multiple linear members close to each other are connected to each other.

7. The power conversion apparatus according to claim 3, wherein the switching circuit includes an even number of subcircuits,
wherein each of the even number of subcircuits further includes an inductor configured to smooth the signal to be outputted from the subcircuit and to output a smooth signal, and
wherein at least a pair of an even number of the inductors is magnetically coupled.

8. The power conversion apparatus according to claim 3, wherein each of the multiple subcircuits includes
a full bridge circuit including the switching element included in the subcircuit, and
a transformer,
wherein the transformer includes a primary winding formed by winding a single first conductive member or multiple first conductive members connected in parallel multiple times and a secondary winding formed by winding a single second conductive member or multiple second conductive members connected in parallel multiple times, and
wherein at least a winding portion of the primary winding or the secondary winding is disposed between adjacent winding portions of the other of the primary winding or the secondary winding.

9. The power conversion apparatus according to claim 1, wherein each of the multiple switching elements is composed of a wide-bandgap semiconductor.

10. The power conversion apparatus according to claim 1, further comprising:
a container configured to cover the switching circuit and composed of a conductive member.

11. The power conversion apparatus according to claim 1, wherein the electric current outputted from the switching circuit is 50A or more.

12. A vehicle comprising: the power conversion apparatus according to claim 1.

13. A method of controlling a power conversion apparatus including a switching circuit including multiple switching elements, the method comprising:
applying a direct current voltage to an input terminal of the switching circuit; and
converting the direct current voltage applied to the input terminal by controlling and switching the multiple switching elements included in the switching circuit at a predetermined switching frequency with the direct current voltage applied to the input terminal and outputting a converted electric current,
wherein the switching frequency is set such that the switching frequency and a main frequency component of a ripple occurring in the electric current are out of a frequency range used for communication with a vehicle-mounted receiver,
wherein the switching frequency is higher than 300 kHz and is lower than 530 kHz, and
wherein the main frequency component of the ripple is higher than 1800 kHz and is lower than 5900 kHz.

* * * * *